(12) United States Patent
Konji et al.

(10) Patent No.: US 11,057,540 B2
(45) Date of Patent: Jul. 6, 2021

(54) INFORMATION PROCESSING APPARATUS AND CONTROL METHOD

(71) Applicant: CANON KABUSHIKI KAISHA, Tokyo (JP)

(72) Inventors: Mitsuru Konji, Kawasaki (JP); Yuuki Wakabayashi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/740,228

(22) Filed: Jan. 10, 2020

(65) Prior Publication Data
US 2020/0252521 A1 Aug. 6, 2020

(30) Foreign Application Priority Data

Jan. 31, 2019 (JP) .............................. JP2019-016167

(51) Int. Cl.
| | |
|---|---|
| *H04N 1/32* | (2006.01) |
| *G06F 3/12* | (2006.01) |
| *H04W 76/18* | (2018.01) |
| *H04W 8/00* | (2009.01) |
| *H04W 84/12* | (2009.01) |

(52) U.S. Cl.
CPC ....... *H04N 1/32545* (2013.01); *G06F 3/1205* (2013.01); *G06F 3/1236* (2013.01); *G06F 3/1261* (2013.01); *H04W 8/005* (2013.01); *H04W 76/18* (2018.02); *G06F 3/1292* (2013.01); *H04W 84/12* (2013.01)

(58) Field of Classification Search
CPC ..... G06F 3/1236; G06F 3/1292; H04W 8/005
See application file for complete search history.

(56) References Cited

U.S. PATENT DOCUMENTS

| | | | | |
|---|---|---|---|---|
| 8,539,567 | B1* | 9/2013 | Logue | H04L 63/0428 |
| | | | | 726/7 |
| 2013/0331137 | A1* | 12/2013 | Burchill | H04W 16/14 |
| | | | | 455/501 |
| 2014/0176980 | A1* | 6/2014 | Asai | H04N 1/32117 |
| | | | | 358/1.13 |
| 2014/0235170 | A1* | 8/2014 | Zhang | H04W 76/19 |
| | | | | 455/41.2 |

(Continued)

FOREIGN PATENT DOCUMENTS

| | | |
|---|---|---|
| JP | 2016-127455 A | 7/2016 |
| JP | 2017-175468 A | 9/2017 |
| JP | 2017-184170 A | 10/2017 |

*Primary Examiner* — Ted W Barnes
(74) *Attorney, Agent, or Firm* — Canon U.S.A., Inc., IP Division

(57) ABSTRACT

An information processing apparatus capable of communicating using a first communication method and communicating using a second communication method performs, in a case where attempting processing fails to establish a connection with a communication apparatus using the first communication method without using an external apparatus, communication with the communication apparatus by the second communication method and transmits a job to the communication apparatus via the connection with the communication apparatus using the first communication method, the communication being used to establish the connection with the communication apparatus using the first communication method.

23 Claims, 11 Drawing Sheets

(56) References Cited

U.S. PATENT DOCUMENTS

| | | | |
|---|---|---|---|
| 2016/0198498 A1* | 7/2016 | Wada | H04W 4/80 370/338 |
| 2016/0234301 A1* | 8/2016 | Qi | H04W 8/005 |
| 2016/0234870 A1* | 8/2016 | Borges | H04W 4/40 |
| 2017/0123739 A1* | 5/2017 | Konji | H04W 60/005 |
| 2017/0223748 A1* | 8/2017 | Sumiuchi | H04W 76/10 |
| 2017/0280492 A1* | 9/2017 | Kurihara | H04W 76/18 |
| 2017/0289393 A1* | 10/2017 | Yokoyama | H04W 76/10 |
| 2017/0290071 A1* | 10/2017 | Ito | H04W 88/06 |
| 2018/0060005 A1* | 3/2018 | Ueno | G06F 3/1235 |
| 2018/0242174 A1* | 8/2018 | Thotad | H04W 24/04 |
| 2019/0246257 A1* | 8/2019 | Hasegawa | H04W 48/16 |

* cited by examiner

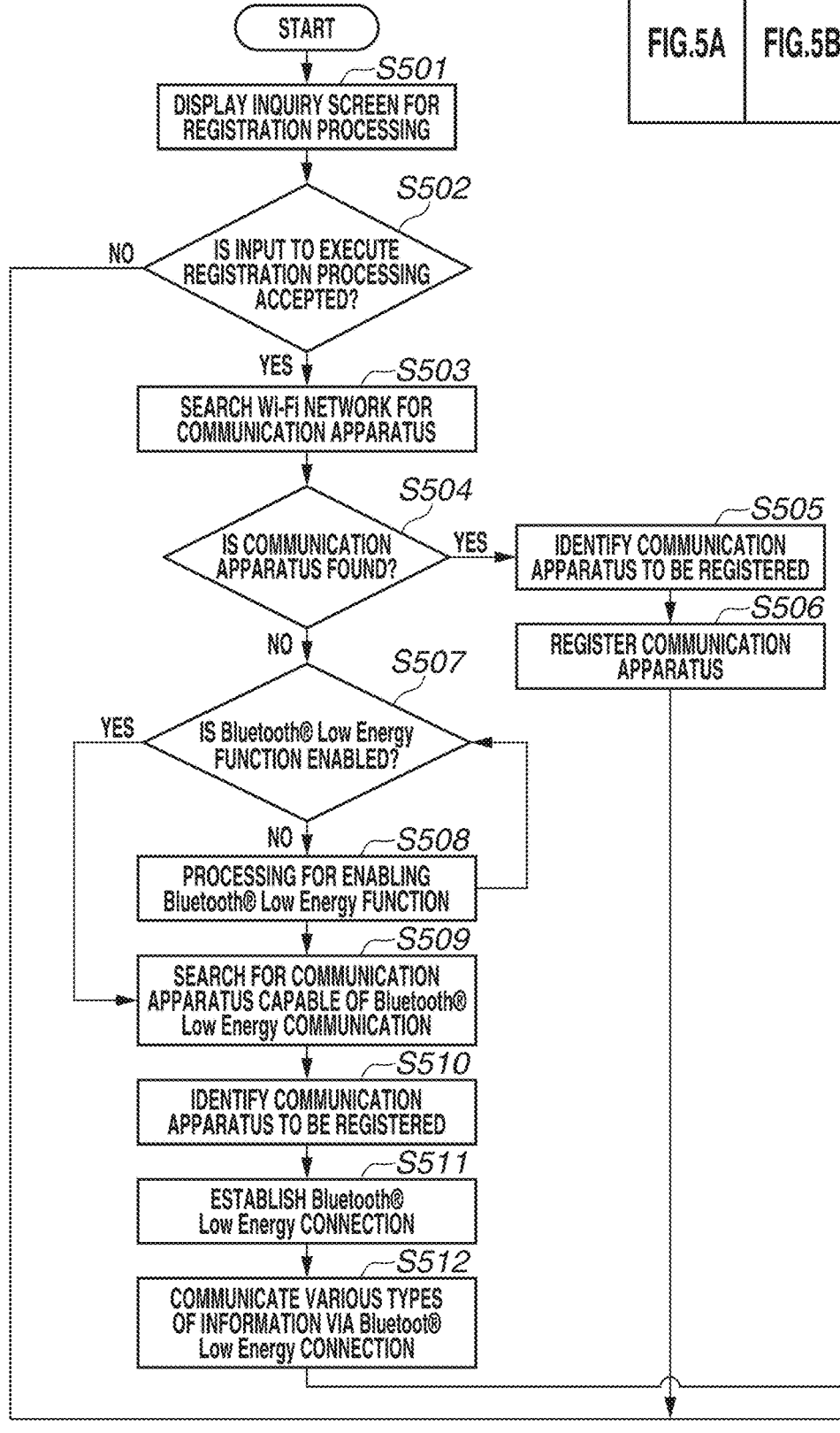

INFORMATION PROCESSING APPARATUS AND CONTROL METHOD

BACKGROUND OF THE INVENTION

Field of the Invention

The present invention relates to an information processing apparatus and a control method.

Description of the Related Art

A method called handover has been known as a method by which an information processing apparatus such as a smartphone transmits a job to a communication apparatus such as a network-capable printer. A handover refers to, for example, a method by which the information processing apparatus performs communication, which is used for establishment of a connection with the communication apparatus using a first communication method, with the communication apparatus by a second communication method, and then transmits a job to the communication apparatus via the connection with the communication apparatus using the first communication method. Japanese Patent Application Laid-Open No. 2017-184170 discusses a configuration for communicating a job by handover.

A demand for more adaptable job communication control is increasing more than ever as configurations capable of handover-based job communication become widespread.

The present invention is directed to controlling job communication more appropriately in a configuration where a job can be communicated by handover.

SUMMARY OF THE INVENTION

According to an aspect of the present invention, a control method of an information processing apparatus capable of communicating using a first communication method and communicating using a second communication method includes accepting a communication instruction for predetermined data from a user, after the communication instruction is accepted, performing attempting processing for attempting to establish a connection with a communication apparatus using the first communication method, in a case where the attempting processing successfully establishes the connection with the communication apparatus using the first communication method, communicating the predetermined data with the communication apparatus via a connection with the communication apparatus using the first communication method without communication with the communication apparatus by the second communication method, the communication being used to establish the connection with the communication apparatus using the first communication method, and in a case where the attempting processing fails to establish the connection with the communication apparatus using the first communication method, performing the communication with the communication apparatus by the second communication method and communicating the predetermined data with the communication apparatus via the connection with the communication apparatus using the first communication method, the communication being used to establish the connection with the communication apparatus using the first communication method.

Further features of the present invention will become apparent from the following description of exemplary embodiments with reference to the attached drawings.

DESCRIPTION OF THE EMBODIMENTS

Exemplary embodiments of the present invention will be described below with reference to the drawings. It should be understood that modifications and improvements made to the following exemplary embodiments based on ordinary knowledge of those skilled in the art without departing from the gist of the present invention are also embraced within the scope of the present invention.

An information processing apparatus and a communication apparatus included in a communication system according to an exemplary embodiment will be described. While the present exemplary embodiment will be described using a smartphone as an example of the information processing apparatus, this is not restrictive. Various apparatuses such as a mobile terminal, a notebook personal computer (PC), a tablet terminal, a personal digital assistant (PDA), and a digital camera can be also applied. While the present exemplary embodiment will be described using a printer as an example of the communication apparatus, this is not restrictive. Various apparatuses that can communicate wirelessly with the information processing apparatus can be applied. Examples of printers include an inkjet printer, a full-color laser beam printer, and a monochrome printer. Examples other than printers include a copying machine, a facsimile apparatus, a mobile terminal, a smartphone, a notebook PC, a tablet terminal, a PDA, a digital camera, a music player device, a television set, and a smart speaker. Other examples include a multifunction peripheral having a plurality of functions such as a copy function, a facsimile (FAX) function, and a print function.

Figure 1:
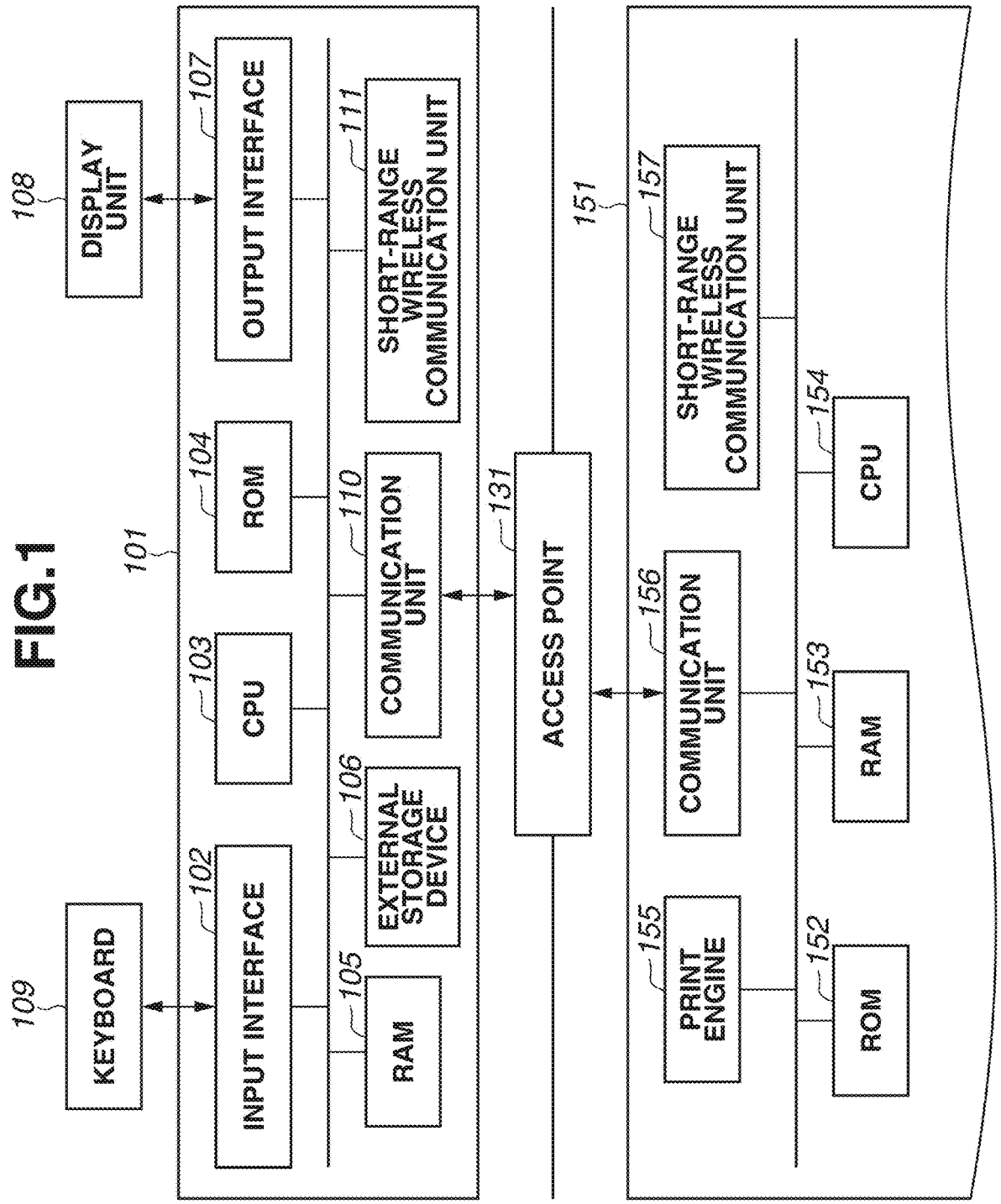
FIG. 1 is a diagram illustrating a configuration example of an information processing apparatus and a communication apparatus according to an exemplary embodiment of the present invention.

A configuration of the information processing apparatus according to the present exemplary embodiment and the communication apparatus capable of communicating with the information processing apparatus according to the present exemplary embodiment will initially be described with reference to the block diagram of FIG. 1. While the present exemplary embodiment is described using the following configuration as an example, the present exemplary embodiment can be applied to an apparatus that can communicate with a communication apparatus and is not limited to the illustrated functions in particular.

An information processing apparatus 101 is an information processing apparatus according to the present exemplary embodiment. The information processing apparatus 101 includes an input interface 102, a central processing unit (CPU) 103, a read-only memory (ROM) 104, a random access memory (RAM) 105, an external storage device 106, an output interface 107, a display unit 108, a communication unit 110, and a short-range wireless communication unit 111. A computer of the information processing apparatus 101 includes the CPU 103, the ROM 104, and the RAM 105.

The input interface 102 is an interface for accepting data input and operation instructions from a user performing an operation on an operation unit such as a keyboard 109. The operation unit may be a physical keyboard or physical buttons. The operation unit may be a software keyboard or software buttons displayed on the display unit 108. Specifically, the input interface 102 may accept user's input via the display unit 108.

The CPU 103 is a system control unit and controls the entire information processing apparatus 101.

The ROM 104 stores fixed data such as a control program to be executed by the CPU 103, data tables, and a built-in operating system (OS) program. In the present exemplary embodiment, the control program stored in the ROM 104 performs software execution controls such as scheduling, task switching, and interrupt handling under management of the built-in OS program stored in the ROM 104.

The RAM 105 includes a static RAM (SRAM) using a backup power supply. Since the RAM 105 retains data by using a not-illustrated primary battery for data backup, important data such as program control variables can be stored without volatilization. The RAM 105 includes a memory area where setting information about the information processing apparatus 101 and management data of the information processing apparatus 101 are stored. The RAM 105 is also used as a main memory and a work memory of the CPU 103.

The external storage device 106 stores an application that controls the communication apparatus 151 (hereinafter, referred to as a printing application) and a print information generation program that generates print information interpretable by the communication apparatus 151. The printing application is used to set an access point for the communication apparatus 151 to connect to and to cause the communication apparatus 151 to perform printing. The printing application may have functions other than a print function. For example, the printing application may have a function of scanning a document set on the communication apparatus 151, a function of setting an access point for the communication apparatus 151 to connect to, and a function of checking a state of the communication apparatus 151. For example, the printing application is installed from an external server by Internet communication via the communication unit 110, and stored in the external storage device 106. The external storage device 106 also stores various programs including an information transmission and reception control program for performing transmission and reception with the communication apparatus 151 connected via the communication unit 110, and various types of information to be used by the programs.

The output interface 107 is used to control data display and notification of the state of the information processing apparatus 101 by the display unit 108.

The display unit 108 includes a light-emitting diode (LED) and/or a liquid crystal display (LCD), and displays data and issues a notification of the state of the information processing apparatus 101.

The communication unit 110 communicates with apparatuses such as the communication apparatus 151 and the access point 131 for data communication. For example, the communication unit 110 can connect to an access point (not illustrated) in the communication apparatus 151. The connection of the communication unit 110 with the access point in the communication apparatus 151 enables mutual communication between the information processing apparatus 101 and the communication apparatus 151. The communication unit 110 may communicate directly with the communication apparatus 151 by wireless communication, or communicate via an external apparatus outside the information processing apparatus 101 and the communication apparatus 151. Examples of the external apparatus include an external access point (such as the access point 131) outside the information processing apparatus 101 and outside the communication apparatus 151, and a non-access-point apparatus that can relay communication. Examples of the wireless communication method include Wireless Fidelity (Wi-Fi®). Among examples of the access point 131 are devices such as a wireless local area network (LAN) router. In the present exemplary embodiment, the method by which the information processing apparatus 101 and the communication apparatus 151 communicate directly without using an external access point will be referred to as a direct connection method. The method by which the information processing apparatus 101 and the communication apparatus 151 communicate via an external access point will be referred to as an infrastructure connection method.

The short-range wireless communication unit 111 connects wirelessly to an apparatus such as the communication apparatus 151 at a short range for data communication. The short-range wireless communication unit 111 communicates by using a communication method different from that of the communication unit 110. The short-range wireless communication unit 111 can connect to, for example, a short-range wireless communication unit 157 in the communication apparatus 151. Examples of the communication method include near field communication (NFC), Bluetooth® Classic, Bluetooth® Low Energy, and Wi-Fi Aware.

In the present exemplary embodiment, the communication unit 110 is configured to communicate at higher speed and over a longer distance than the short-range wireless communication unit 111. The short-range wireless communication unit 111 is used to exchange communication information for performing communication using the communication unit 110 with an apparatus such as the communication apparatus 151.

The communication apparatus 151 is a communication apparatus according to the present exemplary embodiment. The communication apparatus 151 includes a ROM 152, a RAM 153, a CPU 154, a print engine 155, a communication unit 156, and the short-range wireless communication unit 157. A computer of the communication apparatus 151 includes the ROM 152, the RAM 153, and the CPU 154.

As the access point in the communication apparatus 151, the communication unit 156 includes an access point for connecting to an apparatus such as the information processing apparatus 101. The access point can connect to the communication unit 110 of the information processing apparatus 101. If the communication unit 156 activates the access point, the communication apparatus 151 operates as an access point. The communication unit 156 may communicate directly with the information processing apparatus 101 by wireless communication, or communicate via the access point 131. Examples of the communication method include Wi-Fi®. The communication unit 156 may include hardware functioning as an access point. The communication unit 156 may operate as an access point by using software for implementing the access point function.

The short-range wireless communication unit 157 wirelessly connects to an apparatus such as the information processing apparatus 101 at a short distance. For example, the short-range wireless communication unit 157 can connect to the short-range wireless communication unit 111 in the information processing apparatus 101. Examples of the communication method include NFC, Bluetooth® Classic, Bluetooth® Low Energy, and Wi-Fi Aware.

In the present exemplary embodiment, the communication unit 156 communicates at higher speed and over a longer distance than the short-range wireless communication unit 157. The short-range wireless communication unit 157 is used to exchange communication information for performing communication using the communication unit 156 with an apparatus such as the information processing apparatus 101.

The RAM 153 includes an SRAM using a backup power supply. Since the RAM 153 retains data by using a not-illustrated primary battery for data backup, important data such as program control variables can be stored without volatilization. The RAM 153 includes a memory area where setting information about the communication apparatus 151 and management data of the communication apparatus 151 are stored. The RAM 153 is also used as a main memory and a work memory of the CPU 154. The RAM 153 functions as a reception buffer for temporarily storing print information received from the information processing apparatus 101, and stores various types of information.

The ROM 152 stores fixed data such as a control program to be executed by the CPU 154, data tables, and a built-in OS program. In the present exemplary embodiment, the control program stored in the ROM 152 performs software execution controls such as scheduling, task switching, and interrupt handling under management of the built-in OS program stored in the ROM 152.

The CPU 154 is a system control unit and controls the entire communication apparatus 151.

The print engine 155 forms an image on a recording medium such as paper by applying a recording agent such as ink onto the recording medium based on information stored in the RAM 153 and a print job received from the information processing apparatus 101, and outputs the print result. Since a print job transmitted from the information processing apparatus 101 typically has a large amount of data, the print job is desirably communicated by using a communication method capable of high speed communication. The communication apparatus 151 therefore receives the print job via the communication unit 156 that can communicate at higher speed than the short-range wireless communication unit 157.

A memory such as an external hard disk drive (HDD) and a Secure Digital (SD) card may be attached to the communication apparatus 151 as an optional device. The information to be stored in the communication apparatus 151 may be stored in the memory.

The communication apparatus 151 according to the present exemplary embodiment can operate in an infrastructure mode and a peer-to-peer (P2P) mode as modes where communication is performed by using the communication unit 156. In the present exemplary embodiment, the communication units 110 and 156 communicate via a wireless LAN (Wi-Fi).

In the infrastructure mode, the communication apparatus 151 communicates with another apparatus such as the information processing apparatus 101 via an external apparatus that forms a network (for example, an external access point outside the communication apparatus 151 and outside the information processing apparatus 101). The connection with the external access point established by the communication apparatus 151 operating in the infrastructure mode will be referred to as an infrastructure connection. In the present exemplary embodiment, the communication apparatus 151 operates as a slave station and the external access point operates as a master station in the infrastructure connection. In the present exemplary embodiment, a master station refers to an apparatus that determines a communication channel or channels to be used in the network to which the master station belongs. A slave station refers to an apparatus that does not determine the communication channel(s) to be used in the network to which the slave station belongs, and uses the communication channel(s) determined by the master station.

In the P2P mode, the communication apparatus 151 communicates directly with another apparatus such as the information processing apparatus 101 without using an external apparatus forming a network. In the present exemplary embodiment, the P2P mode includes access point (AP) mode 1 where the communication apparatus 151 operates as a first AP, and AP mode 2 where the communication apparatus 151 operates as a second AP. The first and second APs can be connected by using respective different pieces of connection information. The P2P may also include, for example, a Wi-Fi Direct (WFD) mode where the communication apparatus 151 communicates by WFD. Which of a plurality of WFD-capable devices operates as a master station is determined, for example, by a sequence called Group Owner Negotiation. Alternatively, a master station may be determined without Group Owner Negotiation. A WFD-capable apparatus that plays the role of the master station will be referred to as a group owner in particular. The connection directly established with another apparatus by the communication apparatus 151 operating in the P2P mode will be referred to as a direct connection. In the present exemplary embodiment, the communication apparatus 151 operates as a master station and the other apparatus operates as a slave station in the direct connection.

While the P2P mode in the present exemplary embodiment includes AP mode 1 and AP mode 2, this is not restrictive. For example, the P2P mode may include AP mode 3 where the communication apparatus 151 operates as a third AP. Yet alternatively, the P2P mode may include either one of AP modes 1 and 2. If, for example, the P2P mode includes AP mode 1 and not AP mode 2, AP mode 2 in the following description shall be rephrased as AP mode 1.

While the information processing apparatus 101 and the communication apparatus 151 are described to share the processing in the foregoing manner by way of example, the manner of sharing is not limited thereto and the processing may be shared differently.

In the present exemplary embodiment, the short-range wireless communication units 111 and 157 communicate by Bluetooth® Low Energy. In the present exemplary embodiment, the short-range wireless communication unit 157 functions as an advertiser (or slave) that broadcasts advertising information to be described below, and the short-range wireless communication unit 111 functions as a scanner (or master) that receives the advertising information.

Processing for transmitting advertising information and receiving a Bluetooth® Low Energy connection request according to the Bluetooth® Low Energy standard will be described with reference to FIG. 2. In the present exemplary embodiment, as described above, the short-range wireless communication unit 157 operates as a slave device. The processing mentioned above is thus performed by the short-range wireless communication unit 157.

In Bluetooth® Low Energy communication, the short-range wireless communication unit 157 divides the 2.4-GHz frequency band into 40 channels (i.e., 0th to 39th channels of 0 ch to 39 ch) for communication. Among these channels, the short-range wireless communication unit 157 uses the 37th to 39th channels to transmit advertising information and receive a Bluetooth® Low Energy connection request, and the 0th to 36th channels for data communication after Bluetooth® Low Energy connection. The data communication after Bluetooth® Low Energy connection is called Generic Attribute Profile (GATT) communication. The GATT refers to a profile for controlling reading and writing (transmission and reception) of information in the Bluetooth® Low Energy standard. In GATT communication, the information processing apparatus 101 plays a role of a GATT client and the communication apparatus 151 a GATT server, and the information processing apparatus 101 reads and writes information from/to the communication apparatus 151 based on the GATT-based profile.

Figure 2:
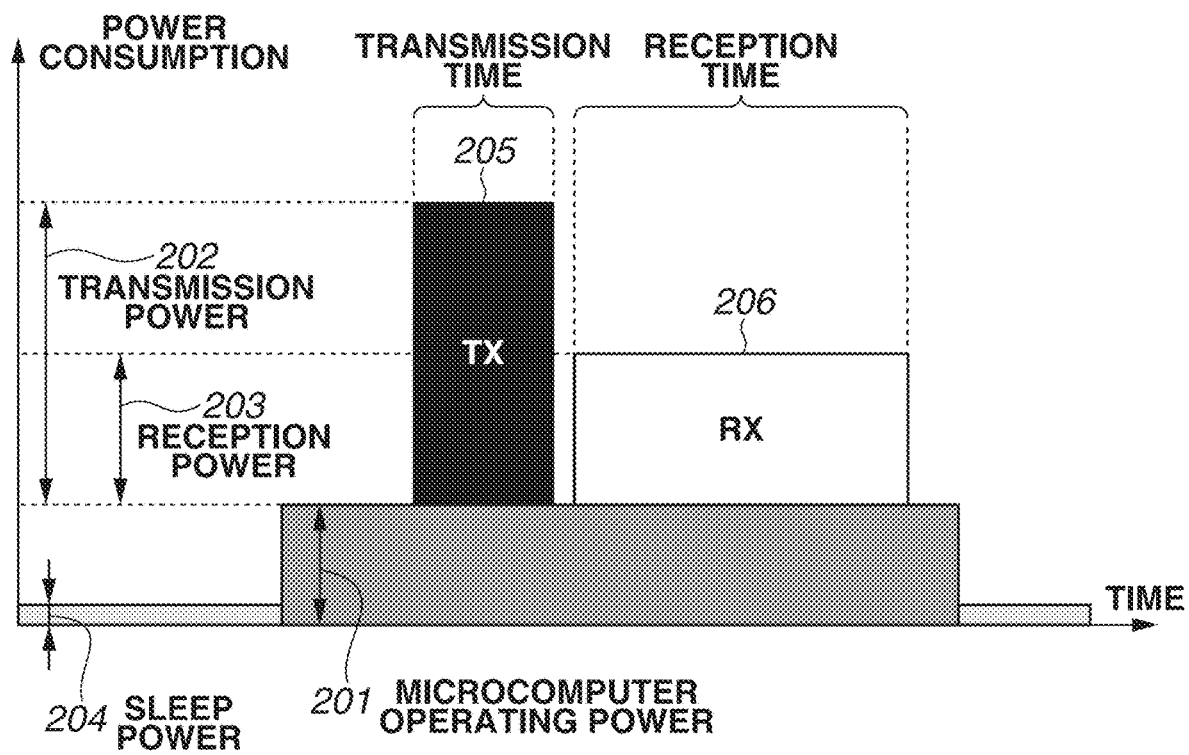
FIG. 2 is a diagram illustrating processing for broadcasting advertising information and receiving a Bluetooth® Low Energy connection request.

The vertical axis of FIG. 2 indicates the power consumption of the short-range wireless communication unit 157, and the horizontal axis indicates time. FIG. 2 illustrates process by process the power consumption in transmitting advertising information by using a single channel. Total power consumption Tx 205 represents the total power consumption during transmission processing that is processing for broadcasting advertising information. Total power consumption Rx 206 represents the total power consumption during reception processing that is processing for maintaining a receiver that receives a Bluetooth® Low Energy request active. Transmission power 202 indicates instantaneous power consumption in the transmission processing. Reception power 203 indicates instantaneous power consumption in the reception processing. Microcomputer operating power 201 indicates instantaneous power consumption when a microcomputer in the short-range wireless communication unit 157 is operating. The microcomputer operates even before, after, and between the transmission processing and the reception processing because the microcomputer is activated in advance to execute and stop the transmission processing and the reception processing. If advertising information is transmitted by using a plurality of channels, the power consumption increases as much as the number of channels used to transmit the advertising information. Sleep power 204 indicates the instantaneous power consumption of the short-range wireless communication unit 157 when the microcomputer is not operating and the short-range wireless communication unit 157 is in a power saving state. After thus performing the transmission processing by using a predetermined channel, the short-range wireless communication unit 157 waits for a Bluetooth® Low Energy connection request to be transmitted from the information processing apparatus 101 by performing the reception processing for a certain time, using the same channel. If the short-range wireless communication unit 157 receives a Bluetooth® Low Energy connection request from the information processing apparatus 101, the short-range wireless communication unit 157 establishes a Bluetooth® Low Energy connection and performs GATT communication with the information processing apparatus 101.

Figure 3:
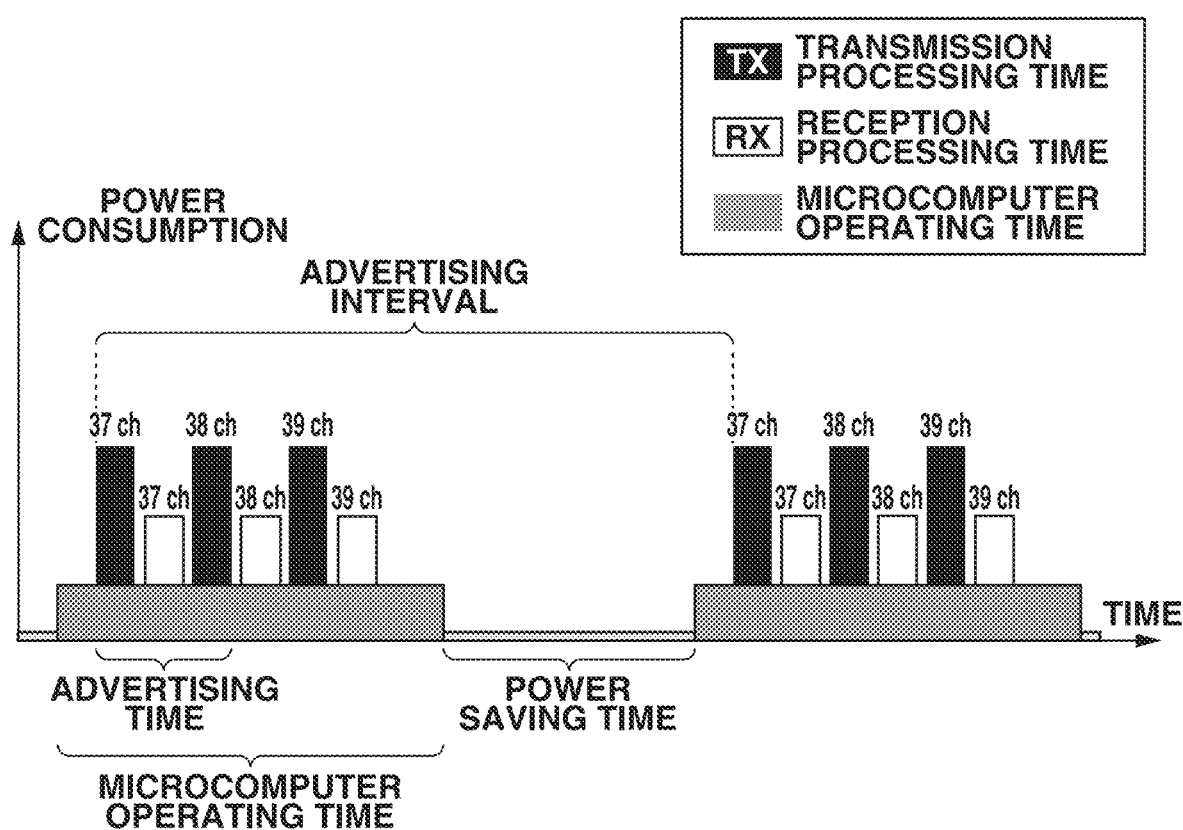
FIG. 3 is a diagram illustrating Bluetooth® Low Energy advertising.

As illustrated in FIG. 3, the short-range wireless communication unit 157 repeats the transmission processing and the reception processing of the advertising information three times channel by channel, and then stops the operation of the microcomputer to enter the power saving state for a certain time. The combination of the transmission processing and the reception processing of the advertising information on a predetermined channel will be hereinafter referred to as an advertisement. A time interval at which the advertising information is transmitted through a predetermined channel will be referred to as an advertising interval. The number of advertisements to be repeated between the initial advertisement and the power saving state can be freely changed to any numbers less than or equal to three.

Figure 4:
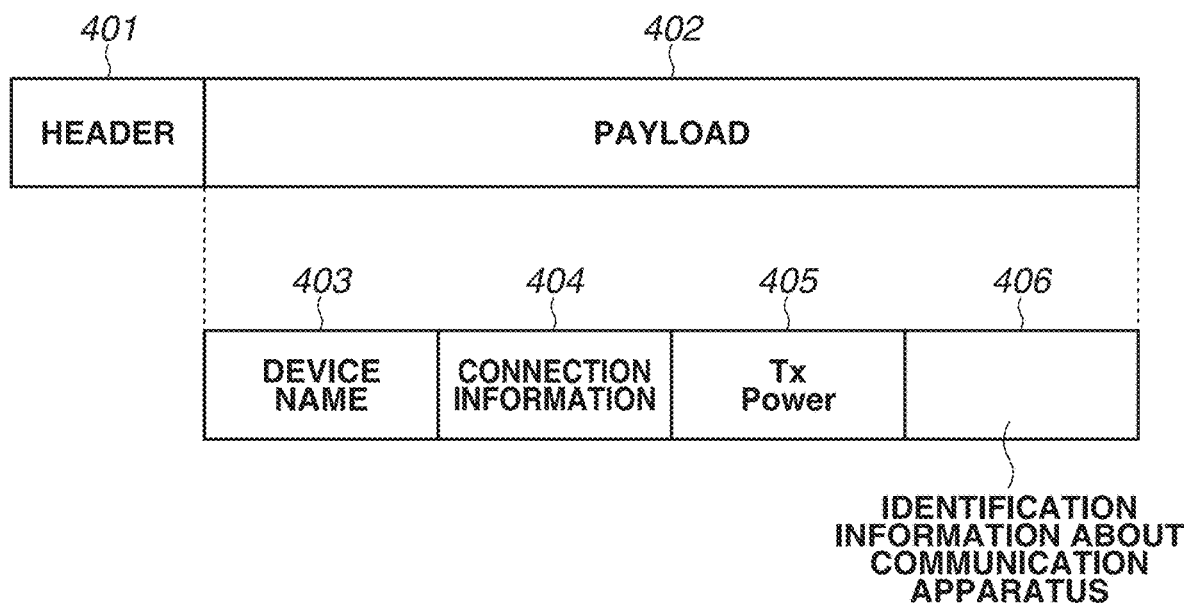
FIG. 4 is a diagram illustrating a structure of the advertising information.

FIG. 4 illustrates an example of a structure of the advertising information that the short-range wireless communication unit 157 broadcasts to communication apparatuses 151 nearby.

When power supply is started, the short-range wireless communication unit 157 performs initialization processing and enters an advertising state. Entering the advertising state, the short-range wireless communication unit 157 periodically broadcasts the advertising information around based on the advertising interval. The advertising information is a signal including basic header information (such as identification information for identifying the apparatus transmitting the advertising information), and includes a header 401 and a payload 402. The information processing apparatus 101 can recognize the presence of the communication apparatus 151 by receiving the advertising information. The information processing apparatus 101 can also establish a Bluetooth® Low Energy connection with the communication apparatus 151 by transmitting a Bluetooth® Low Energy connection request to the communication apparatus 151. The header 401 is an area storing information such as the type of advertising information and the size of the payload 402. The payload 402 stores information such as a device name 403 serving as identification information, loaded profile information, connection information 404 for establishing a Bluetooth® Low Energy connection with the communication apparatus 151, and the transmission power (Tx Power) 405 of the advertising information. Identification information 406 about the communication apparatus 151 may be included in the advertising information. Examples of the identification information 406 about the communication apparatus 151 include a serial number of the communication apparatus 151, service information about the communication apparatus 151, a service set identifier (SSID) of the communication apparatus 151 operating as an AP, and a password. Such information may be communicated not as advertising information but by GATT communication.

In the present exemplary embodiment, the information processing apparatus 101 and the communication apparatus 151 perform pairing processing (authentication processing) for authentication therebetween. In the present exemplary embodiment, GATT communications include a communication that can be performed without pairing between the information processing apparatus 101 and the communication apparatus 151, and a communication that can only be performed with the information processing apparatus 101 and the communication apparatus 151 paired. Such a configuration can prevent important information retained by the communication apparatus 151 from being accidentally obtained by an information processing apparatus 101 not yet authenticated (not having performed the pairing processing with the communication apparatus 151).

A method called handover, using short-range wireless communication such as Bluetooth® Low Energy has been known as a method by which the information processing apparatus 101 transmits a job to the communication apparatus 151 by the printing application. Specifically, in a handover, the information processing apparatus 101 performs communication for performing Wi-Fi communication with the communication apparatus 151 by Bluetooth® Low Energy communication after a job transmission instruction is issued (print button is pressed). Specific examples of the communication for performing Wi-Fi communication with the communication apparatus 151 include reception of information (connection information) for performing Wi-Fi communication with the communication apparatus 151 and transmission of an instruction for shifting the communication apparatus 151 into a state capable of Wi-Fi communication. The information processing apparatus 101 performs the communication for performing Wi-Fi communication with the communication apparatus 151 as described above, and then transmits a job to the communication apparatus 151 by Wi-Fi communication.

A handover is effective, for example, in a case where the information processing apparatus 101 retains no connection information when the job transmission instruction is given, or where the communication apparatus 151 has activated only the Bluetooth® Low Energy function and not the Wi-Fi function. However, there is an issue that performing Bluetooth® Low Energy communication and then Wi-Fi communication to transmit a job as described above takes a long time, compared to performing only Wi-Fi communication to transmit the job without Bluetooth® Low Energy communication.

In other words, when job transmission is instructed by the user, whether to perform Bluetooth® Low Energy communication before performing Wi-Fi communication for job transmission or perform only Wi-Fi communication for job transmission without Bluetooth® Low Energy communication is desired to be appropriately controlled. The present exemplary embodiment describes a configuration for performing such a control.

<Processing for Registering Communication Apparatus 151 Using Bluetooth® Low Energy>

In the present exemplary embodiment, to transmit a job to the communication apparatus 151 by the printing application, the information processing apparatus 101 obtains predetermined information from the communication apparatus 151 and registers the communication apparatus 151 in the printing application. The processing for registering the communication apparatus 151 in the printing application will be referred to as registration processing.

Figure 5B:
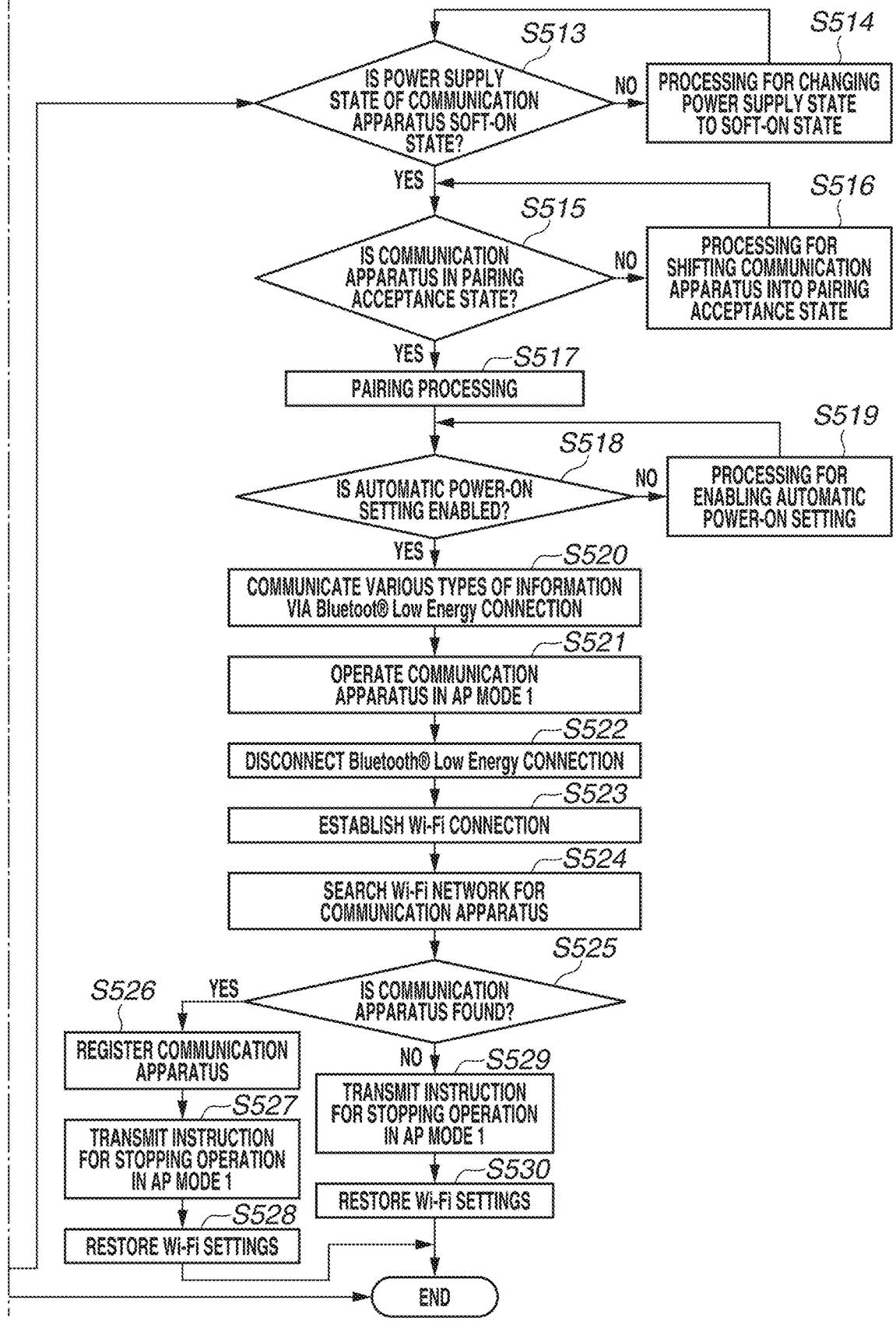
FIG. 5 is a diagram including flowcharts of FIGS. 5A and 5B illustrating a procedure of registration processing performed by the information processing apparatus.

FIG. 5 is a diagram including flowcharts of FIGS. 5A and 5B illustrating a processing procedure that the information processing apparatus 101 executes in the registration processing according to the present exemplary embodiment. For example, the flowchart illustrated in FIG. 5 is implemented by the CPU 103 reading the printing application stored in the ROM 104 or the external storage device 106 into the RAM 105 and executing the printing application. The flowchart illustrated in FIG. 5 is started in response to activation of the printing application.

In step S501, the CPU 103 displays an inquiry screen on the display unit 108 to inquire of the user whether to perform the registration processing.

In step S502, the CPU 103 determines whether an input to execute the registration processing from the user is accepted. In a case where the CPU 103 determines that an input to execute the registration processing from the user is accepted (YES in step S502), the processing proceeds to step S503. In a case where the CPU 103 determines that an input to execute the registration processing from the user is not accepted (NO in step S502), the processing of the present flowchart ends, and the CPU 103 displays a top screen for executing various functions of the printing application on the display unit 108.

In step S503, which is performed in a case where the CPU 103 determines that an input to execute the registration processing from the user is accepted (YES in step S502), the CPU 103 searches a Wi-Fi network to which the information processing apparatus 101 belongs for a communication apparatus 151 capable of communication using the printing application (supporting the printing application). Specifically, the CPU 103 broadcasts information for requesting a response from a communication apparatus 151 capable of communication using the printing application to the Wi-Fi network to which the information processing apparatus 101 belongs, and waits for a response to the information. By receiving a response to the information, the CPU 103 finds the communication apparatus 151 capable of communication using the printing application. For example, the response includes an Internet Protocol (IP) address, and the CPU 103 can communicate with the communication apparatus 151 found by the search by using the IP address included in the response. An example of the Wi-Fi network to which the information processing apparatus 101 belongs is a network formed by the external AP that the information processing apparatus 101 is in Wi-Fi connection with. Specifically, for example, a communication apparatus 151 in Wi-Fi connection with the external AP that the information processing apparatus 101 is in Wi-Fi connection with is searched for in the present processing.

In step S504, the CPU 103 determines whether a communication apparatus 151 capable of communication using the printing application is found by the search in step S503. The determination of this determination processing is equivalent to whether a communication apparatus 151 capable of communication using the printing application is connected to the external AP that the information processing apparatus 101 is in Wi-Fi connection with. In a case where the CPU 103 determines that a communication apparatus 151 capable of communication using the printing application is found (YES in step S504), the processing proceeds to step S505. In a case where the CPU 103 determines that a communication apparatus 151 capable of communication using the printing application is not found (NO in step S504), the processing proceeds to step S507.

In step S505, which is performed in a case where the CPU 103 determines that a communication apparatus 151 capable of communication using the printing application is found (YES in step S504), the CPU 103 identifies a communication apparatus 151 to be registered in the printing application among communication apparatuses 151 found by the search in step S503. Specifically, for example, the CPU 103 identifies a communication apparatus 151 transmitting the earliest response received by the information processing apparatus 101 among the communication apparatuses 151 found by the search in step S503 as the communication apparatus 151 to be registered in the printing application.

In step S506, the CPU 103 registers the communication apparatus 151 identified in step S505 in the printing application. Specifically, the CPU 103 initially obtains information for registering the communication apparatus 151 in the printing application from the communication apparatus 151 via the infrastructure connection. Examples of the information for registering the communication apparatus 151 in the printing application include information about capabilities of the communication apparatus 151, and the serial number and a media access control (MAC) address of the communication apparatus 151. Examples of the information about the capabilities of the communication apparatus 151 include information about recording media that the communication apparatus 151 can use for printing, information indicating whether the communication apparatus 151 can perform two-sided printing, and information indicating whether the communication apparatus 151 can perform color printing. The registration of the communication apparatus 151 in the printing application enables a button for accepting job transmission instructions from the user. In other words, the information processing apparatus 101 can transmit a job to the communication apparatus 151 registered in the printing application by using the printing application. The printing application can also display a print setting screen based on the received information about the capabilities of the communication apparatus 151. The printing application can generate a print job based on print settings input on the print setting screen.

In step S507, which is performed in a case where the CPU 103 determines that a communication apparatus 151 capable of communication using the printing application is not found (NO in step S504), the CPU 103 determines whether the Bluetooth® Low Energy function of the information processing apparatus 101 is enabled. In a case where the CPU 103 determines that the Bluetooth® Low Energy function of the information processing apparatus 101 is enabled (YES in step S507), the processing proceeds to step S509. In a case where the CPU 103 determines whether the Bluetooth® Low Energy function of the information processing apparatus 101 is not enabled (NO in step S507), the processing proceeds to step S508.

In step S508, the CPU 103 performs processing for enabling the Bluetooth® Low Energy function of the information processing apparatus 101. Specifically, for example, the CPU 103 displays a screen for prompting the user to enable the Bluetooth® Low Energy function of the information processing apparatus 101 on the display unit 108. Alternatively, for example, as the processing of step S508, the CPU 103 may display a system screen for enabling the Bluetooth® Low Energy function of the information processing apparatus 101 on the display unit 108, or automatically enable the Bluetooth® Low Energy function without accepting user operations. The processing then returns to step S507.

In step S509, the CPU 103 searches the vicinity of the information processing apparatus 101 for a communication apparatus 151 capable of Bluetooth® Low Energy communication using the printing application. Specifically, the CPU 103 enables a function of receiving Bluetooth® Low Energy advertising information by the short-range wireless communication unit 157, and searches the vicinity of the information processing apparatus 101 for an apparatus transmitting advertising information.

In step S510, the CPU 103 identifies a communication apparatus 151 to be registered in the printing application from among communication apparatuses 151 found by the search in step S509. Specifically, for example, the CPU 103 identifies a communication apparatus 151 transmitting the earliest advertising information received by the information processing apparatus 101 among the communication apparatuses 151 found by the search in step S509 as the communication apparatus 151 to be registered in the printing application.

In step S511, the CPU 103 establishes a Bluetooth® Low Energy connection between the communication apparatus 151 identified in step S510 and the information processing apparatus 101.

In step S512, the CPU 103 communicates various types of information with the communication apparatus 151 identified in step S510 via the Bluetooth® Low Energy connection. Specifically, the CPU 103 receives information about the state of the communication apparatus 151 identified in step S510, and transmits information about the name of the information processing apparatus 101.

In step S513, the CPU 103 determines whether a power supply state of the communication apparatus 151 identified in step S510 is a soft-on state based on the information received in step S512. The soft-on state refers to a state where the components of the communication apparatus 151 for performing various functions such as printing, scanning, and screen display are powered on and the communication apparatus 151 can perform the various functions. Examples of states other than the soft-on state include a soft-off state. The soft-off state refers to a state where some of the components of the communication apparatus 151 are not powered on, the power consumption is lower than power consumption in the soft-on state, and the communication apparatus 151 is unable to perform various functions such as printing, scanning, and screen display. The possible states of the communication apparatus 151 may also include a state where the power consumption is lower than power consumption in the soft-on state and higher than power consumption in the soft-off state. In a case where the CPU 103 determines that a power supply state of the communication apparatus 151 identified in step S510 is not a soft-on state (NO in step S513), the processing proceeds to step S514. In a case where the CPU 103 determines that a power supply state of the communication apparatus 151 identified in step S510 is a soft-on state (YES in step S513), the processing proceeds to step S515.

In step S514, which is performed in a case where the CPU 103 determines that a power supply state of the communication apparatus 151 identified in step S510 is not a soft-on state (NO in step S513), the CPU 103 performs processing for changing the power supply state of the communication apparatus 151 identified in step S510 to the soft-on state. Specifically, for example, the CPU 103 displays a screen for prompting the user to change the power supply state of the communication apparatus 151 identified in step S510 to the soft-on state on the display unit 108. Alternatively, for example, the CPU 103 may change the power supply state of the communication apparatus 151 identified in step S510 to the soft-on state by transmitting information for changing the power supply state of the communication apparatus 151 to the soft-on state to the communication apparatus 151 via the Bluetooth® Low Energy connection. The processing then returns to step S513.

In step S515, which is performed in a case where the CPU 103 determines that a power supply state of the communication apparatus 151 identified in step S510 is a soft-on state (YES in step S513), the CPU 103 determines whether the communication apparatus 151 identified in step S510 is in a pairing acceptance state based on the information received in step S511. The pairing acceptance state refers to a state where the communication apparatus 151 can perform pairing processing. For example, if a predetermined pairing processing button on the communication apparatus 151 is pressed, or if a power button of the communication apparatus 151 is pressed in a state where initial settings of the communication apparatus 151 have not been made (product delivery state), the communication apparatus 151 enters the pairing acceptance state for a predetermined time. In a case where the CPU 103 determines that the communication apparatus 151 identified in step S510 is not in a pairing acceptance state (NO in step S515), the processing proceeds to step S516. In a case where the CPU 103 determines that the communication apparatus 151 identified in step S510 is in a pairing acceptance state (YES in step S515), the processing proceeds to step S517.

In step S516, which is performed in a case where the CPU 103 determines that the communication apparatus 151 identified in step S510 is not in a pairing acceptance state (NO in step S515), the CPU 103 performs processing for shifting the communication apparatus 151 identified in step S510 into the pairing acceptance state. Specifically, for example, the CPU 103 displays a screen for prompting the user to shift the communication apparatus 151 identified in step S510 into the pairing acceptance state on the display unit 108. Alternatively, for example, the CPU 103 may shift the communication apparatus 151 identified in step S510 into the pairing acceptance state by transmitting information for shifting the communication apparatus 151 into the pairing acceptance state to the communication apparatus 151 via the Bluetooth® Low Energy connection. The processing then returns to step S515.

In step S517, which is performed in a case where the CPU 103 determines that the communication apparatus 151 identified in step S510 is in a pairing acceptance state (YES in step S515), the CPU 103 performs pairing processing between the communication apparatus 151 and the information processing apparatus 101. The pairing processing is processing for enabling secure communication between the communication apparatus 151 and the information processing apparatus 101 by the communication apparatus 151 and the information processing apparatus 101 authenticating each other. The processing to be performed here may be pairing processing defined by the Bluetooth® Low Energy standard or pairing processing specific to the vendor of the communication apparatus 151.

The pairing processing according to the present exemplary embodiment will be described. The information processing apparatus 101 initially obtains information called a key seed, which is information retained by the communication apparatus 151, from the communication apparatus 151 via the Bluetooth® Low Energy connection. The information processing apparatus 101 and the communication apparatus 151 then each generate key information (authentication information) from the key seed according to their respective rules recognized in advance. The generated pieces of key information are stored in a storage area (for example, ROM 104) of the information processing apparatus 101 and a storage area (for example, ROM 152) of the communication apparatus 151, respectively. In other words, the information processing apparatus 101 and the communication apparatus 151 retain the same key information. Since the key information is thus generated and GATT communication can be performed using the key information, the communication apparatus 151 and the information processing apparatus 101 are authenticated with each other, whereby the pairing processing is completed. After the completion of the pairing processing, the information processing apparatus 101 and the communication apparatus 151 communicate information encrypted based on the key information. If the information processing apparatus 101 and the communication apparatus 151 receive information encrypted based on the key information, the information processing apparatus 101 and the communication apparatus 151 can recognize the unencrypted information by decrypting the information using the key information retained by the own apparatus. The pairing method is not limited to the foregoing. For example, a method using a personal identification number (PIN) code may be used.

In step S518, the CPU 103 determines whether an automatic power-on setting of the communication apparatus 151 identified in step S510 is enabled based on the information received in step S511. The automatic power-on setting refers to a setting of a function for automatically shifting the communication apparatus 151 into the soft-on state if the communication apparatus 151 is in the soft-off state and wireless communication is made to the communication apparatus 151. In the present exemplary embodiment, if the automatic power-on setting is enabled, the communication apparatus 151 maintains the Bluetooth® Low Energy communication function enabled even in the soft-off state. If the automatic power-on setting is disabled, the communication apparatus 151 disables the Bluetooth® Low Energy communication function in the soft-off state. As in the processing of the present flowchart, Bluetooth® Low Energy communication is performed as appropriate after the registration processing of the communication apparatus 151 is performed using Bluetooth® Low Energy. The determination is thus made to enable the Bluetooth® Low Energy function of the communication apparatus 151 even when the communication apparatus 151 is in the soft-off state. In a case where the CPU 103 determines that an automatic power-on setting of the communication apparatus 151 identified in step S510 is not enabled (NO in step S518), the processing proceeds to step S519. In a case where the CPU 103 determines that an automatic power-on setting of the communication apparatus 151 identified in step S510 is enabled (YES in step S518), the processing proceeds to step S520.

In step S519, which is performed in a case where the CPU 103 determines that an automatic power-on setting of the communication apparatus 151 identified in step S510 is not enabled (NO in step S518), the CPU 103 performs processing for enabling the automatic power-on setting of the communication apparatus 151 identified in step S510. Specifically, for example, the CPU 103 displays a screen for prompting the user to enable the automatic power-on setting of the communication apparatus 151 identified in step S510 on the display unit 108. Alternatively, for example, the CPU 103 may enable the automatic power-on setting of the communication apparatus 151 identified in step S510 by transmitting information for enabling the automatic power-on setting of the communication apparatus 151 to the communication apparatus 151 via the Bluetooth® Low Energy connection. The processing then returns to step S518.

In step S520, which is performed in a case where the CPU 103 determines that an automatic power-on setting of the communication apparatus 151 identified in step S510 is enabled (YES in step S518), the CPU 103 communicates various types of information with the communication apparatus 151 identified in step S510 via the Bluetooth® Low Energy connection. Specifically, the CPU 103 obtains first connection information for connecting directly to the communication apparatus 151 operating in AP mode 1, second connection information for connecting directly to the communication apparatus 151 operating in AP mode 2, and identification information about the communication apparatus 151. Specific examples of connection information include an SSID and a password. Examples of the identification information about the communication apparatus 151 include the serial number of the communication apparatus 151, the MAC address of the communication apparatus 151, and a Bonjour name of the communication apparatus 151. The CPU 103 may obtain the second connection information not by Bluetooth® Low Energy communication in step S520 but by Wi-Fi communication in step S526 to be described below.

In step S521, the CPU 103 transmits an instruction to operate the communication apparatus 151 in AP mode 1 to the communication apparatus 151 via the Bluetooth® Low Energy connection. The communication apparatus 151 thereby starts to operate in AP mode 1. In the present exemplary embodiment, the communication apparatus 151 uses the 2.4-GHz frequency band for direct connection when operating in AP mode 1. However, the 5-GHZ frequency band may be used.

In step S522, the CPU 103 disconnects the Bluetooth® Low Energy connection between the information processing apparatus 101 and the communication apparatus 151. The CPU 103 may omit the processing of step S522 to maintain the Bluetooth® Low Energy connection.

In step S523, the CPU 103 establishes a Wi-Fi connection between the communication apparatus 151 operating in AP mode 1 and the information processing apparatus 101 by using the first connection information obtained in step S520. Before establishing the Wi-Fi connection between the communication apparatus 151 operating in AP mode 1 and the information processing apparatus 101, the CPU 103 stores the Wi-Fi settings of the information processing apparatus 101 prior to the establishment of the Wi-Fi connection.

In step S524, the CPU 103 searches the Wi-Fi network established in step S523 for the communication apparatus 151 by using the serial number obtained in step S520. A specific search method in step S524 is similar to that in step S503, whereas the search target in step S524 is the communication apparatus 151 identified in step S510 (i.e., the communication apparatus 151 corresponding to the serial number obtained in step S520). Instead of the serial number, other identification information about the communication apparatus 151, such as the MAC address, may be used for the search.

In step S525, the CPU 103 determines whether the communication apparatus 151 identified in step S510 is found by the search in step S524. In a case where the CPU 103 determines that the communication apparatus 151 identified in step S510 is found by the search in step S524 (YES in step S525), the processing proceeds to step S526. In a case where the CPU 103 determines that the communication apparatus 151 identified in step S510 is not found by the search in step S524 (NO in step S525), the processing proceeds to step S529. An example of the case where the communication apparatus 151 identified in step S510 is unable to be found by the search in step S524 is when a network fault occurs.

In step S526, which is performed in a case where the CPU 103 determines that the communication apparatus 151 identified in step S510 is found by the search in step S524 (YES in step S525), the CPU 103 registers the communication apparatus 151 identified in step S510 in the printing application. A specific method for registration in step S526 is similar to that in step S506.

In step S527, the CPU 103 transmits an instruction for stopping operation in AP mode 1 to the communication apparatus 151 identified in step S510 via the Wi-Fi connection. Receiving the instruction, the communication apparatus 151 stops operating in AP mode 1, and restores the Wi-Fi settings of the communication apparatus 151 to those before the operation in AP mode 1.

In step S528, the CPU 103 restores the Wi-Fi settings of the information processing apparatus 101 to those before the establishment of the Wi-Fi connection in step S523. Specifically, the CPU 103 restores the destination of the Wi-Fi connection of the information processing apparatus 101 to that before the establishment of the Wi-Fi connection in step S523 based on the information stored in step S523. If there has been no Wi-Fi connection established before the processing of the present flowchart is performed, the CPU 103 simply disconnects the Wi-Fi connection between the communication apparatus 151 and the information processing apparatus 101.

In step S529, which is performed in a case where the CPU 103 determines that the communication apparatus 151 identified in step S510 is not found by the search in step S524 (NO in step S525), the CPU 103 transmits an instruction for stopping operation in AP mode 1 to the communication apparatus 151 identified in step S510 via the Wi-Fi connection. Since the communication apparatus 151 is not found by the search in step S525, the instruction usually does not reach the communication apparatus 151. However, the instruction can be delivered if the network failure is resolved and the Wi-Fi connection is restored. The instruction in step S529 is transmitted just in case.

In step S530, the CPU 103 restores the Wi-Fi settings of the information processing apparatus 101 to those before the establishment of the Wi-Fi connection in step S523. Details of this processing are similar to those of step S528.

In the above described manner, the communication apparatus 151 that is the communication target is registered in the printing application. This enables the information processing apparatus 101 to transmit a job to the communication apparatus 151 that is the communication target afterward.

In the present exemplary embodiment, if there is a communication apparatus 151 on the Wi-Fi network to which the information processing apparatus 101 belongs (YES in step S504), the information processing apparatus 101 registers the communication apparatus 151 in the printing application by using only Wi-Fi communication without using a Bluetooth® Low Energy communication. Meanwhile, in a case where there is no communication apparatus 151 on the Wi-Fi network to which the information processing apparatus 101 belongs (NO in step S504), the information processing apparatus 101 registers a communication apparatus 151 in the printing application by Wi-Fi communication performed via Bluetooth® Low Energy communication.

With the above described configuration, the information processing apparatus 101 can quickly register the communication apparatus 151 in the printing application in a case where there is a communication apparatus 151 on the Wi-Fi network to which the information processing apparatus 101 belongs (YES in step S504). Even if there is no communication apparatus 151 on the Wi-Fi network to which the information processing apparatus 101 belongs (NO in step S504), the information processing apparatus 101 can register a communication apparatus 151 in the printing application by using Bluetooth® Low Energy.

Figure 6:
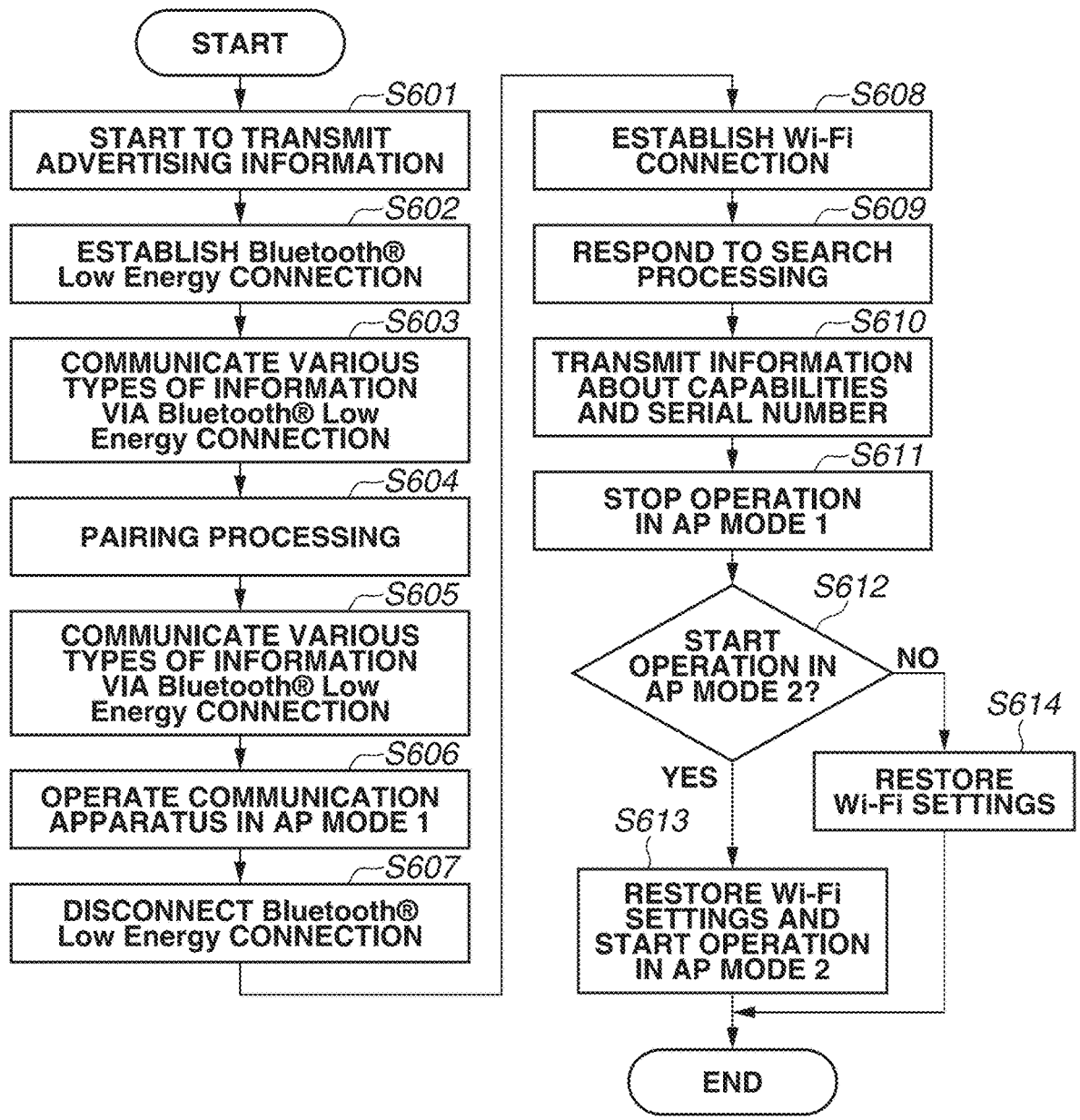
FIG. 6 is a flowchart illustrating a procedure of registration processing performed by the communication apparatus.

FIG. 6 is a flowchart illustrating a processing procedure that the communication apparatus 151 performs in the registration processing according to the present exemplary embodiment. For example, the flowchart illustrated in FIG. 6 is implemented by the CPU 154 reading a program stored in the ROM 152 or an external storage device (not illustrated) included in the communication apparatus 151 into the RAM 153 and executing the program. The processing illustrated in the present flowchart is started in a state where the Bluetooth® Low Energy function of the communication apparatus 151 is enabled. The Bluetooth® Low Energy function of the communication apparatus 151 is enabled, for example, based on power-on of the communication apparatus 151 in a state where the initial settings of the communication apparatus 151 have not been completed (product delivery state) or pressing of a predetermined button for the Bluetooth® Low Energy function on the communication apparatus 151. The processing illustrated in the present flowchart is processing in a case where the communication apparatus 151 and the information processing apparatus 101 do not belong to the same Wi-Fi network.

In step S601, the CPU 154 starts to transmit Bluetooth® Low Energy advertising information by using the short-range wireless communication unit 157.

In step S602, the CPU 154 receives a response to the advertising information transmitted in step S601 from the information processing apparatus 101, and thereby establishes a Bluetooth® Low Energy connection between the information processing apparatus 101 and the communication apparatus 151.

In step S603, the CPU 154 communicates various types of information with the information processing apparatus 101 via the Bluetooth® Low Energy connection. Specifically, the CPU 154 transmits the information about the state of the communication apparatus 151 and receives the information about the name of the information processing apparatus 101.

In step S604, the CPU 154 performs the pairing processing between the communication apparatus 151 and the information processing apparatus 101. Details of the pairing processing are as described above. The CPU 154 manages which apparatus is paired with the communication apparatus 151 based on the information about the name of the information processing apparatus 101 received in step S603.

In step S605, the CPU 154 communicates various types of information with the information processing apparatus 101 via the Bluetooth® Low Energy connection. Specifically, the CPU 154 transmits the first connection information, the second connection information, and the identification information about the communication apparatus 151.

In step S606, the CPU 154 operates the communication apparatus 151 in AP mode 1 based on the instruction transmitted from the information processing apparatus 101 in step S521. Before operating the communication apparatus 151 in AP mode 1, the CPU 154 stores the Wi-Fi settings of the communication apparatus 151.

In step S607, the CPU 154 disconnects the Bluetooth® Low Energy connection between the information processing apparatus 101 and the communication apparatus 151. The CPU 154 may omit the processing of step S607 to maintain the Bluetooth® Low Energy connection.

In step S608, the CPU 154 establishes a Wi-Fi connection between the communication apparatus 151 and the information processing apparatus 101 based on the reception of the first connection information from the information processing apparatus 101.

In step S609, the CPU 154 responds to the search processing by the information processing apparatus 101.

In step S610, the CPU 154 transmits the information about the capabilities of the communication apparatus 151 and the serial number of the communication apparatus 151 to the information processing apparatus 101 via the Wi-Fi connection.

In step S611, the CPU 154 receives an instruction for stopping operation in AP mode 1 from the information processing apparatus 101 via the Wi-Fi connection, and stops operation in AP mode 1. The Wi-Fi connection between the communication apparatus 151 and the information processing apparatus 101 is thereby disconnected.

In step S612, the CPU 154 determines whether to start operation in AP mode 2. Specifically, the CPU 154 determines whether an infrastructure connection (connection with an AP) has been established using the 5-GHz frequency band before the start of the operation in AP mode 1. If an infrastructure connection has been established using the 5-GHz frequency band before the start of the operation in AP mode 1, the CPU 154 determines to not start operation in AP mode 2. If no infrastructure connection has been established using the 5-GHz frequency band before the start of the operation in AP mode 1, the CPU 154 determines to start operation in AP mode 2. Examples of the case where no infrastructure connection has been established using the 5-GHz frequency band include where an infrastructure connection has been established using the 2.4-GHz frequency band and where no infrastructure connection has been established at all. In a case where the CPU 154 determines to start operation in AP mode 2 (YES in step S612), the processing proceeds to step S613. In a case where the CPU 154 determines to not start operation in AP mode 2 (NO in step S612), the processing proceeds to step S614.

In step S613, which is performed in a case where the CPU 154 determines to start operation in AP mode 2 (YES in step S612), the CPU 154 restores the Wi-Fi settings of the communication apparatus 151 to those before the operation in AP mode 1 based on the information stored in step S606, and allows the communication apparatus 151 to start to operate in AP mode 2. Specifically, for example, if the state of the communication apparatus 151 before the operation in AP mode 1 is where an infrastructure connection is established using the 2.4-GHz frequency band, the CPU 154 initially reestablishes the infrastructure connection using the 2.4-GHz frequency band. The CPU 154 then starts simultaneous operations by operating the communication apparatus 151 in AP mode 2 using the 2.4-GHz frequency band. The processing of the present flowchart ends. In the present exemplary embodiment, the CPU 154 uses not the 5-GHz frequency band but the 2.4-GHz frequency band in AP mode 2 started here, even if the state before the operation in AP mode 1 is where no infrastructure connection is established.

In step S614, which is performed in a case where the CPU 154 determines to not start operation in AP mode 2 (NO in step S612), the CPU 154 restores the Wi-Fi settings of the communication apparatus 151 to those before the operation in AP mode 1 based on the information stored in step S606. In other words, the CPU 154 reestablishes the infrastructure connection using the 5-GHz frequency band. Here, the CPU 154 does not allow the communication apparatus 151 to start operation in AP mode 2. The processing of the present flowchart ends.

The CPU 154 may perform the processing for restoring the Wi-Fi settings of the communication apparatus 151 to those prior to the operation in AP mode 1 before the determination of step S612, instead of in step S613 or S614.

The reason why the processing of steps S612 to S614 is performed will be described.

In the present exemplary embodiment, the communication apparatus 151 can perform simultaneous operations. Simultaneous operations refer to performing operations while maintaining an infrastructure connection and a direct connection simultaneously (in parallel). In simultaneous operations, the communication apparatus 151 may be connected to respective different apparatuses by the direct connection and the infrastructure connection. In other words, the communication apparatus 151 can connect to a plurality of apparatuses in parallel by simultaneous operations.

Communication by the infrastructure connection and communication by the direct connection are performed by using specific frequency bands (specific channels). In each of the communications by the infrastructure connection and the direct connection, the channel to be used for the communication and connection between the apparatuses is initially determined before the communication is started. Concurrent allocation of a plurality of channels to a wireless integrated circuit (IC) chip for communication complicates the configuration of the communicating apparatuses and the processing to be performed by the apparatuses. In performing simultaneous operations, the communication apparatus 151 therefore desirably uses the same channel for the communications in the respective modes. In other words, the communication apparatus 151 desirably uses a single channel even during simultaneous operations. In the present exemplary embodiment, the communication unit 156 includes only one wireless IC chip that implements communications on a predetermined channel. The communication apparatus 151 does not communicate by using a plurality of channels at a time.

If the communication apparatus 151 operates as a group owner or AP, the communication apparatus 151 serving as the master station can freely determine the channel to be used for direct connection. By contrast, the channel to be used for infrastructure connection is determined by the apparatus serving as the master station in the infrastructure connection, such as an external AP. In performing simultaneous operations, the communication apparatus 151 therefore desirably determines the channel used for infrastructure connection, determined by the external AP, to be the channel used for direct connection.

A function called dynamic frequency selection (DFS) to be described below is applied to direct connections using specific channels among those corresponding to the 5-GHz frequency band. Depending on the apparatus configuration, the presence of the function can preclude the communication apparatus 151 from establishing a direct connection using a channel corresponding to the 5-GHz frequency band, or make it undesirable for the communication apparatus 151 to establish a direct connection using a channel corresponding to the 5-GHz frequency band. Specifically, for example, the wireless IC chip included in the communication unit 156 can be unable or undesirable to operate as a group owner or AP (i.e., master station) using a channel corresponding to the 5-GHz frequency band. DFS will now be described.

An apparatus operating as a group owner or AP, and a master station such as an external AP, execute DFS during communication using a specific frequency band such as the 5-GHz frequency band. DFS is a technique for controlling communication between apparatuses to not affect weather radars. If a specific apparatus such as a weather radar uses a certain frequency, interference waves occur at the certain frequency. The DFS technique switches the frequency (channel) used by the master station within a specific frequency band including the certain frequency. Specifically, if interference waves are detected at the frequency that the master station is using, the master station initially suspends communication in the specific frequency band for a predetermined time (for example, one minute). While the communication is suspended, the communication apparatus 151 checks whether a new channel is available after the suspension of the communication is cancelled (whether the frequency corresponding to the channel is used by a specific apparatus such as a weather radar). If the channel is confirmed to be available, the master station cancels the suspension of the communication and resumes communication on the new channel. Detection of interference waves by a master station at the frequency the master station uses for communication means that the master station detects that the frequency the master station is using for communication is used by a specific apparatus such as a weather radar. A technique called transmit power control (TPC) is a technique similar to DFS.

If the communication channel in use is detected to be used by a specific apparatus such as a weather radar, it is the master station in the communication system that controls switching of the communication channel in use. The slave station follows the processing if the communication channel in use is switched by the master station. Specifically, in the infrastructure connection using the 5-GHz frequency band, if the external AP switches channels by DFS, the communication apparatus 151 follows to switch the channels. DFS and TPC apply to communication in a specific frequency band such as the 5-GHz frequency band and not to communication in frequency bands such as 2.4-GHz frequency band. The communication apparatus 151 will not switch the channel used for communication in the 2.4-GHz frequency band based on the communication condition of a specific apparatus such as a weather radar. The reason is that specific apparatuses such as a weather radar communicate using the 5-GHz frequency band and not the 2.4-GHz frequency band. That is, DFS or TPC channel switching occurs when the apparatuses communicate using the 5-GHz frequency band. As described above, DFS channel switching occurs between channels corresponding to the 5-GHz frequency band.

Some wireless IC chips support DFS and some do not. If the wireless IC chip used in the communication apparatus 151 does not support DFS, the communication apparatus 151 is unable to switch the used communication channel by DFS when operating as a master station. The communication apparatus 151 using the wireless IC chip not supporting DFS is thus incapable of 5-GHz direct connection. As described above, in simultaneous operations, an infrastructure connection and a direct connection share the same channel. The communication apparatus 151 using the wireless IC chip not supporting DFS (communication apparatus 151 incapable of 5-GHz direct connection) is therefore unable to perform simultaneous operations if the 5-GHz frequency band is used for the infrastructure connection.

Even if the communication apparatus 151 uses a wireless IC chip supporting DFS (capable of 5-GHz direct connection), there is the following issue. As described above, the channel used for the direct connection can be changed by DFS. Meanwhile, as described above, the infrastructure connection and the direct connection share the same channel in simultaneous operations. In addition, the channel used for the infrastructure connection is unable to be determined by the communication apparatus 151. In other words, if the channel used for the direct connection is changed by DFS during simultaneous operations, the channel used for the infrastructure connection is unable to be changed by the communication apparatus 151. As a result, the infrastructure connection and the direct connection can no longer be maintained in parallel since the infrastructure connection and the direct connection can no longer share the same channel.

Under the circumstances, in the present exemplary embodiment, the communication apparatus 151 will not be operated in AP mode 2 (in a state capable of direct connection) if the state of the communication apparatus 151 before the operation in AP mode 1 is where the infrastructure connection using the 5-GHz frequency band is established. This prevents a direct connection using the 5-GHz frequency band from being established in a state where an infrastructure connection using the 5-GHz frequency band is established.

With such a configuration, the communication apparatus 151, even in an environment where the communication apparatus 151 is unable to be registered in the printing application by using only Wi-Fi communication, can be registered in the printing application by performing Bluetooth® Low Energy communication and then performing Wi-Fi communication. In the present exemplary embodiment, the communication apparatus 151 automatically operates itself in AP mode 2 based on the stop of the operation in AP mode 1. After the registration processing is completed, the communication apparatus 151 continues operating in AP mode 2. The information processing apparatus 101 can thus establish a direct connection between the information processing apparatus 101 and the communication apparatus 151 at any timing afterward. In other words, in job transmission processing, the information processing apparatus 101 can transmit a job to the communication apparatus 151 by using only Wi-Fi communications without using the Bluetooth® Low Energy communication.

In the foregoing description, a direct connection using the 5-GHz frequency band is controlled to not be established in a state where an infrastructure connection using the 5-GHz frequency band is established. However, this is not restrictive. The 5-GHz frequency band includes frequency bands to which DFS (or TPC) is applied and ones to which DFS (or TPC) is not applied. For example, simultaneous operations may be controlled to not be performed in a state where an infrastructure connection using a DFS-applied frequency band in the 5-GHz frequency band is established. Specifically, for example, in step S612, the CPU 154 may determine whether an infrastructure connection (connection with an AP) has been established by using a DFS-applied frequency band in the 5-GHz frequency band before the operation in AP mode 2 is started.

Moreover, for example, even if the state of the communication apparatus 151 before the operation in AP mode 2 is where an infrastructure connection using the 5-GHz frequency band is established, the communication apparatus 151 may operate in a state capable of direct connection. Specifically, for example, to give higher priority to operating the communication apparatus 151 in a state capable of direct connection, the communication apparatus 151 may remain unrestored to its state before the operation in AP mode 2.

<Processing for Transmitting Print Job to Communication Apparatus 151>

Figure 7:
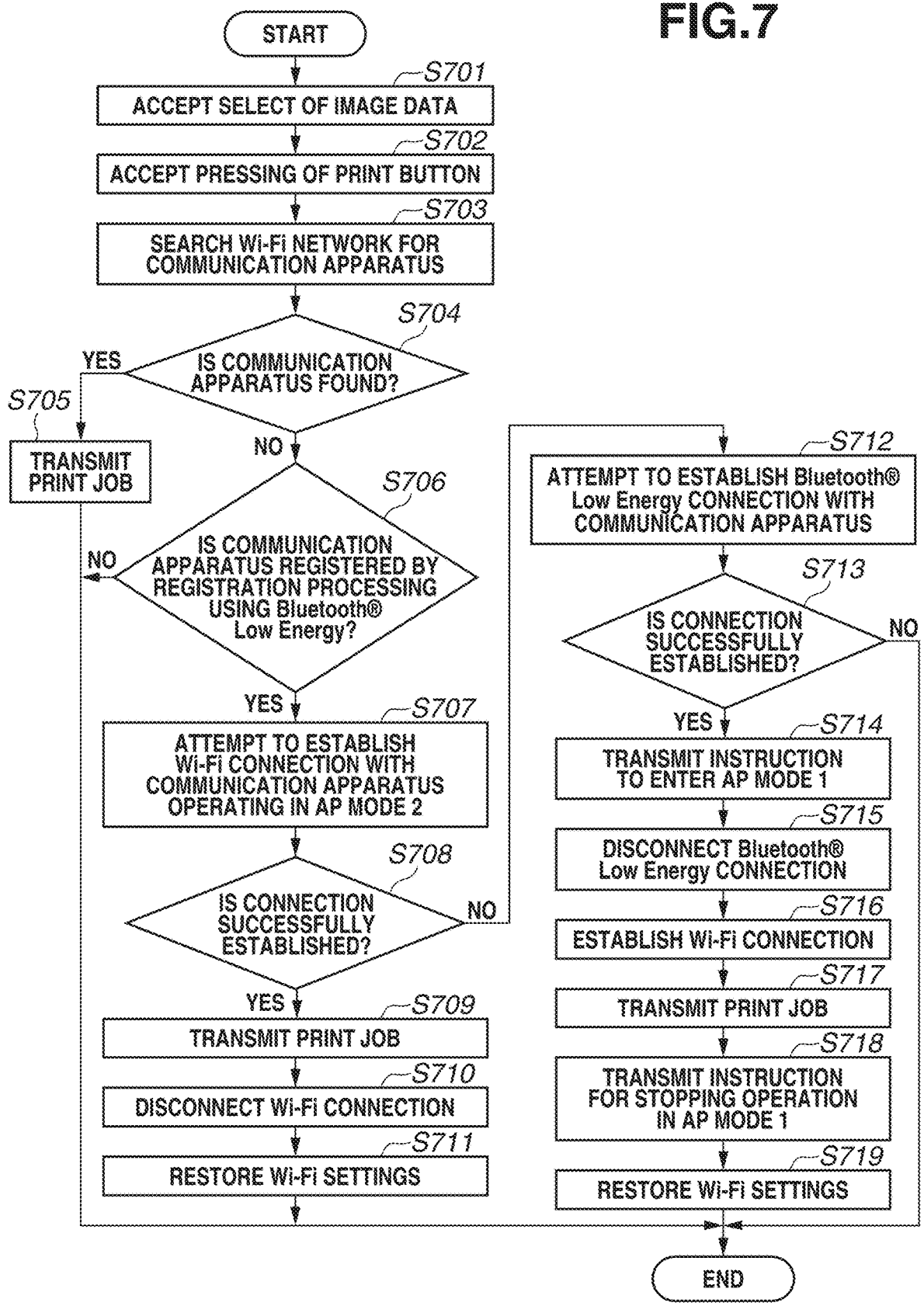
FIG. 7 is a flowchart illustrating a procedure of transmission processing performed by the information processing apparatus.

FIG. 7 is a flowchart illustrating a procedure of job transmission processing performed by the information processing apparatus 101 according to the present exemplary embodiment. For example, the flowchart illustrated in FIG. 7 is implemented by the CPU 103 reading the printing application stored in the ROM 104 or the external storage device 106 into the RAM 105 and executing the printing application. The flowchart illustrated in FIG. 7 is started after the completion of the registration processing of the communication apparatus 151 and in a state where the printing application is running.

Figure 9:
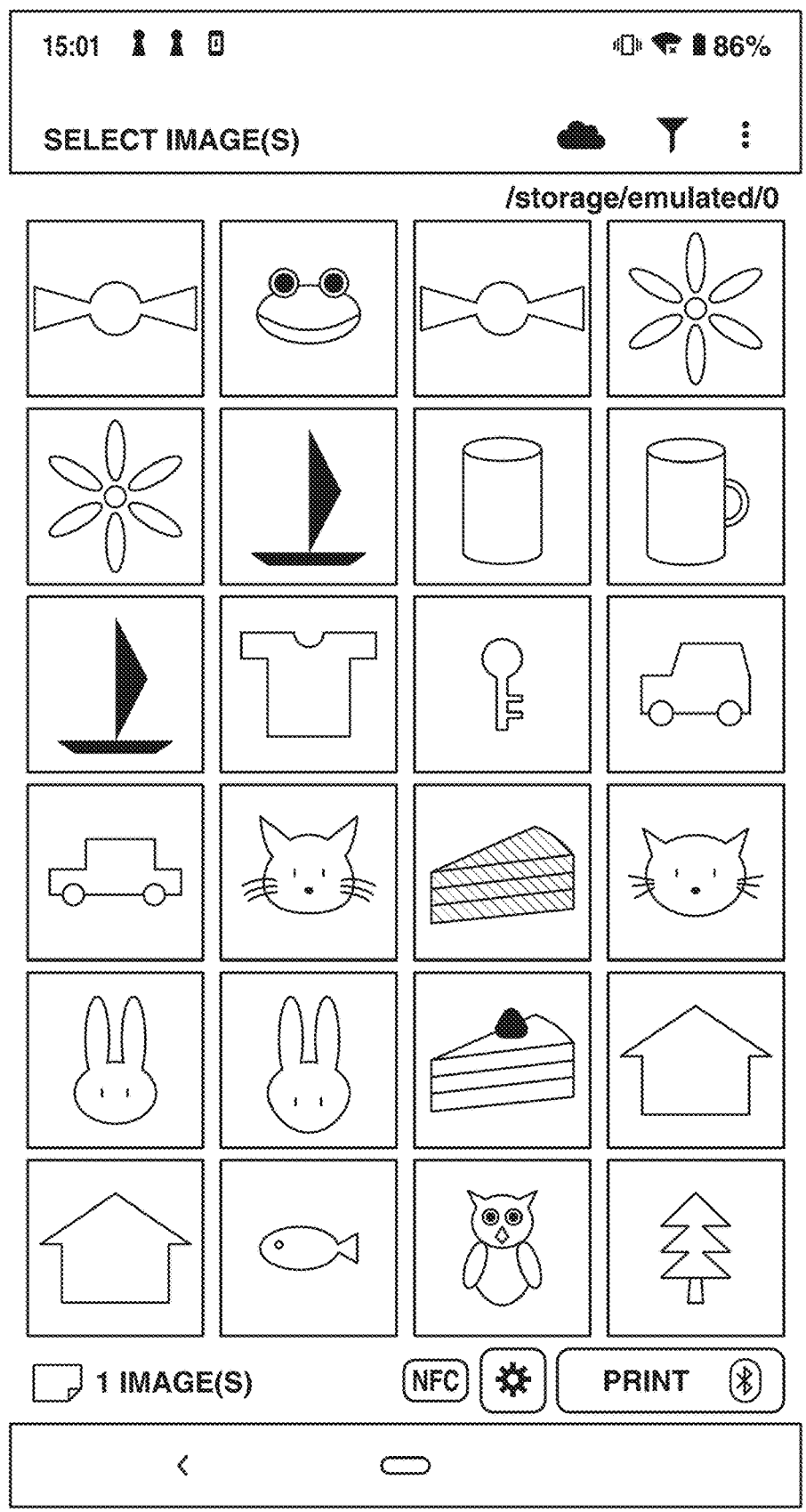
FIG. 9 is a diagram illustrating a screen for selecting image data to be printed.

In step S701, the CPU 103 accepts selection of image data to be printed from the user on an image data selection screen illustrated in FIG. 9.

Figure 10:
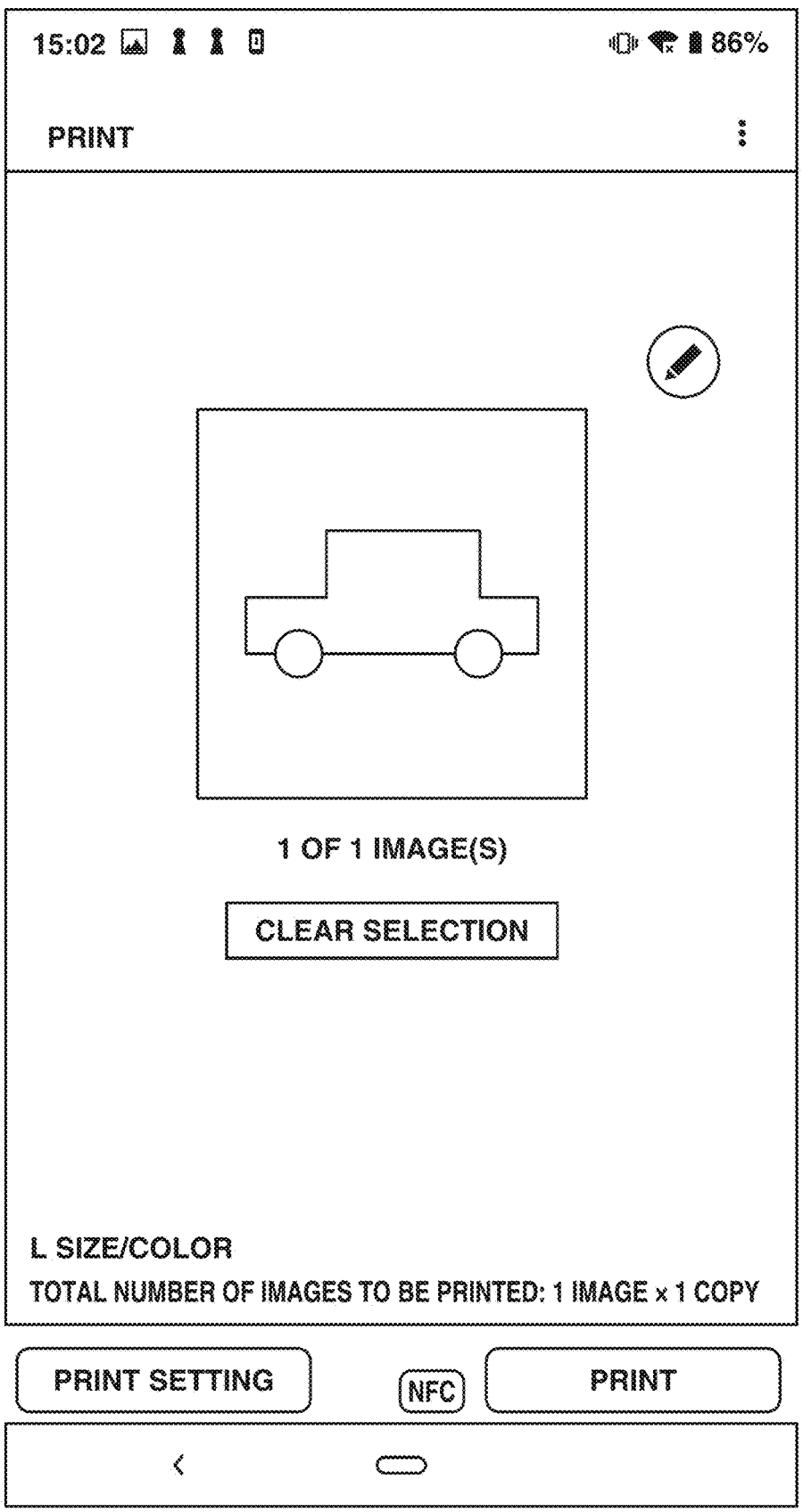
FIG. 10 is a diagram illustrating a screen displayed after the selection of the image data to be printed.

In step S702, the CPU 103 accepts pressing of a print button displayed by the printing application from the user. The print button may be displayed on the image data selection screen illustrated in FIG. 9. The print button may be displayed on a screen illustrated in FIG. 10, which is displayed after the selection of the image data and displays the selected image data. The print button may be displayed on both the screens.

In step S703, the CPU 103 searches the Wi-Fi network to which the information processing apparatus 101 belongs for the communication apparatus 151 registered in the printing application by using the serial number obtained during the registration processing. As described above, the Wi-Fi network to which the information processing apparatus 101 belongs refers to the network formed by the external AP that the information processing apparatus 101 is in Wi-Fi connection with. In other words, for example, the communication apparatus 151 registered in the printing application is searched for from among apparatuses in Wi-Fi connection with the external AP that the information processing apparatus 101 is in Wi-Fi connection with. The search may be performed by using other identification information about the communication apparatus 151, such as a MAC address and a Bonjour name, instead of the serial number. The search may use identification information obtained by Bluetooth® Low Energy in step S512, or identification information obtained by Wi-Fi in step S526.

In step S704, the CPU 103 determines whether the communication apparatus 151 registered in the printing application is found by the search in step S703. The determination in this determination processing corresponds to a determination whether the communication apparatus 151 registered in the printing application is connected to the external AP that the information processing apparatus 101 is in Wi-Fi connection with. In a case where the CPU 103 determines that the communication apparatus 151 registered in the printing application is found by the search in step S703 (YES in step S704), the processing proceeds to step S705. In a case where the CPU 103 determines that the communication apparatus 151 registered in the printing application is not found by the search in step S703 (NO in step S704), the processing proceeds to step S706.

In step S705, which is performed in a case where the CPU 103 determines that the communication apparatus 151 registered in the printing application is found by the search in step S703 (YES in step S704), the CPU 103 transmits a print job to the communication apparatus 151 registered in the printing application via the Wi-Fi network to which the information processing apparatus 101 belongs. The print job transmitted by the CPU 103 is a job for causing the communication apparatus 151 to print the image data selected in step S701. The processing of the present flowchart ends.

In step S706, which is performed in a case where the CPU 103 determines that the communication apparatus 151 registered in the printing application is not found by the search in step S703 (NO in step S704), the CPU 103 determines whether the communication apparatus 151 is registered in the printing application by the registration processing (processing after the determination of NO in step S504) using Bluetooth® Low Energy. In a case where the CPU 103 determines that the communication apparatus 151 is registered in the printing application by the registration processing (YES in step S706), the processing proceeds to step S707. In a case where the CPU 103 determines that the communication apparatus 151 is not registered in the printing application by the registration processing (NO in step S706), the processing of the present flowchart ends.

In step S707, the CPU 103 executes attempting processing for attempting to establish a Wi-Fi connection between the communication apparatus 151 that is registered in the printing application and operating in AP mode 2 and the information processing apparatus 101 by using the second connection information obtained in step S520. Before executing the attempting processing, the CPU 103 stores the Wi-Fi settings of the information processing apparatus 101 prior to the execution of the attempting processing. In the present exemplary embodiment, if the information about the capabilities is obtained via a Wi-Fi connection established by Bluetooth® Low Energy communication, the CPU 103 thus executes the attempting processing. Meanwhile, if the information about the capabilities is obtained via a Wi-Fi connection established without Bluetooth® Low Energy communication, the CPU 103 does not execute the attempting processing. The reason is that if the CPU 103 obtains the information about the capabilities via the Wi-Fi connection established without Bluetooth® Low Energy communication, neither the first connection information nor the second connection information is obtained. Examples of the case where the information about the capabilities is obtained via the Wi-Fi connection established without Bluetooth® Low Energy communication include where the communication apparatus 151 is registered in step S506. In the foregoing description, the attempting processing is executed by using the second connection information obtained in step S520. However, this is not restrictive. For example, the attempting processing may be executed by using second connection information obtained from the communication apparatus 151 at different timing or executed by using second connection information manually input to the information processing apparatus 101 by the user.

In step S708, the CPU 103 determines whether the connection is successfully established in step S707. In a case where the CPU 103 determines that the connection is successfully established in step S707 (YES in step S708), the processing proceeds to step S709. In a case where the CPU 103 determines that the connection is not successfully established in step S707 (NO in step S708), the processing proceeds to step S712. Examples of the case where the connection fails to be established despite the execution of the registration processing illustrated in FIGS. 5 and 6 will be described. An example is where the communication apparatus 151 establishes an infrastructure connection using the 5-GHz frequency band and does not start to operate in AP mode 2 (NO in step S612). Another example is where the communication apparatus 151 starts to operate in AP mode 2 by the processing of step S613 and then stops operating in AP mode 2 based on user operations on the communication apparatus 151.

In step S709, in a case where the CPU 103 determines that the connection is successfully established in step S707 (YES in step S708), the CPU 103 transmits the print job for printing the image data selected in step S701 to the communication apparatus 151 that is registered in the printing application and operating in AP mode 2 via the Wi-Fi connection.

In step S710, the CPU 103 disconnects the Wi-Fi connection between the communication apparatus 151 that is registered in the printing application and operating in AP mode 2 and the information processing apparatus 101.

In step S711, the CPU 103 restores the Wi-Fi settings of the information processing apparatus 101 to those before the execution of the attempting processing based on the information stored in step S707. The processing of the present flowchart ends. In step S712, which is performed in a case where the CPU 103 determines that the connection is not successfully established in step S707 (NO in step S708), the CPU 103 attempts to establish a Bluetooth® Low Energy connection between the communication apparatus 151 registered in the printing application and the information processing apparatus 101 by using the advertising information obtained in step S509. Specifically, the CPU 103 starts to receive advertising information, and attempts to identify the advertising information obtained in step S509 in the received advertising information. If the advertising information obtained in step S509 is successfully identified, the CPU 103 successfully establishes a Bluetooth® Low Energy connection by transmitting a response to the identified advertising information.

In step S713, the CPU 103 determines whether the connection is successfully established in step S712. In a case where the CPU 103 determines that the connection is successfully established in step S712 (YES in step S713), the processing proceeds to step S714. In a case where the CPU 103 determines that the connection is not successfully established in step S712 (NO in step S713), the processing of the present flowchart ends.

In step S714, which is performed in a case where the CPU 103 determines that the connection is successfully established in step S712 (YES in step S713), the CPU 103 transmits an instruction for operating the communication apparatus 151 in AP mode 1 (instruction to enter AP mode 1) to the communication apparatus 151 via the Bluetooth® Low Energy connection. The communication apparatus 151 thereby starts to operate in AP mode 1.

In step S715, the CPU 103 disconnects the Bluetooth® Low Energy connection between the communication apparatus 151 and the information processing apparatus 101. Before disconnecting the Bluetooth® Low Energy connection, the CPU 103 may obtain the first connection information from the communication apparatus 151 via the Bluetooth® Low Energy connection. The CPU 103 may omit the processing of step S715 to maintain the Bluetooth® Low Energy connection.

In step S716, the CPU 103 establishes a Wi-Fi connection between the communication apparatus 151 operating in AP mode 1 and the information processing apparatus 101 by using the first connection information obtained in step S520 or S715. Before establishing the Wi-Fi connection between the communication apparatus 151 operating in AP mode 1 and the information processing apparatus 101, the CPU 103 stores the Wi-Fi settings of the information processing apparatus 101 prior to the establishment of the Wi-Fi connection. Examples of the Wi-Fi settings of the information processing apparatus 101 include a setting about the Wi-Fi connection state of the information processing apparatus 101.

In step S717, the CPU 103 transmits the print job for printing the image data selected in step S701 to the communication apparatus 151 operating in AP mode 1 via the Wi-Fi connection.

In step S718, the CPU 103 transmits an instruction for stopping operation in AP mode 1 to the communication apparatus 151 operating in AP mode 1 via the Wi-Fi connection. Receiving the instruction, the communication apparatus 151 stops operating in AP mode 1, and restores the Wi-Fi settings of the communication apparatus 151 to those before the operation in AP mode 1.

In step S719, the CPU 103 restores the Wi-Fi settings of the information processing apparatus 101 to those before the establishment of the Wi-Fi connection between the communication apparatus 151 operating in AP mode 1 and the information processing apparatus 101 based on the information stored in step S716. The processing of the present flowchart ends.

As described above, in the present exemplary embodiment, if a job transmission instruction is accepted, the information processing apparatus 101 does not immediately attempt a handover but attempts a method for transmitting the job without a handover. Specifically, if a job transmission instruction is accepted, the information processing apparatus 101 attempts to establish a Wi-Fi connection between the communication apparatus 151 that is registered in the printing application and operating in AP mode 2 and the information processing apparatus 101 before performing a handover. If the job transmission instruction is accepted, the information processing apparatus 101 also determines the presence or absence of the communication apparatus 151 registered in the printing application on the Wi-Fi network to which the information processing apparatus 101 belongs before performing a handover.

More specifically, in the present exemplary embodiment, the information processing apparatus 101, if in a state where a job can be transmitted without a handover, quickly transmits the job by performing only Wi-Fi communication without performing a handover (i.e., without using Bluetooth® Low Energy communication). Meanwhile, if in a state where a job can only be transmitted after a handover, the information processing apparatus 101 transmits the job by performing a handover (i.e., by using Bluetooth® Low Energy communication). In such a manner, if the information processing apparatus 101 according to the present exemplary embodiment is instructed to transmit a job by the user, the information processing apparatus 101 appropriately controls whether to transmit the job by performing Bluetooth® Low Energy communication and then performing Wi-Fi communication or transmit the job by performing only Wi-Fi communication without Bluetooth® Low Energy communication. In other words, in the configuration where a job is transmitted by a handover, the information processing apparatus 101 according to the present exemplary embodiment can transmit the job more appropriately.

In the foregoing description, a print job for causing the communication apparatus 151 to perform printing is transmitted. However, this is not restrictive. For example, a scan job for causing the communication apparatus 151 to perform scanning may be transmitted. In such a case, the CPU 103 receives scan data obtained by the communication apparatus 151 performing scanning via the Wi-Fi connection, and then restores the Wi-Fi settings of the information processing apparatus 101.

In the foregoing description, in a case where a job transmission instruction from the user is accepted in step S702, the information processing apparatus 101 performs the search processing in step S703 and then performs the attempting processing in step S707. However, this is not restrictive. For example, in a case where a job transmission instruction from the user is accepted in step S702, the information processing apparatus 101 may perform the attempting processing of step S707 before performing the search processing of step S703. In such a configuration, the information processing apparatus 101 performs the search processing of step S703 in a case where the attempting processing of step S707 fails. In a case where the communication apparatus 151 is not found by the search processing in step S703, the information processing apparatus 101 then performs a handover that is the processing of step S712 and the subsequent steps. Alternatively, for example, the information processing apparatus 101 may omit the search processing of step S703. In such a configuration, in a case where a job transmission instruction from the user is accepted in step S702, the information processing apparatus 101 performs the attempting processing of step S707 without the search processing of step S703. In a case where the attempting processing of step S707 fails, the information processing apparatus 101 performs a handover that is the processing of step S712 and the subsequent steps, without the search processing in step S703.

Figure 8:
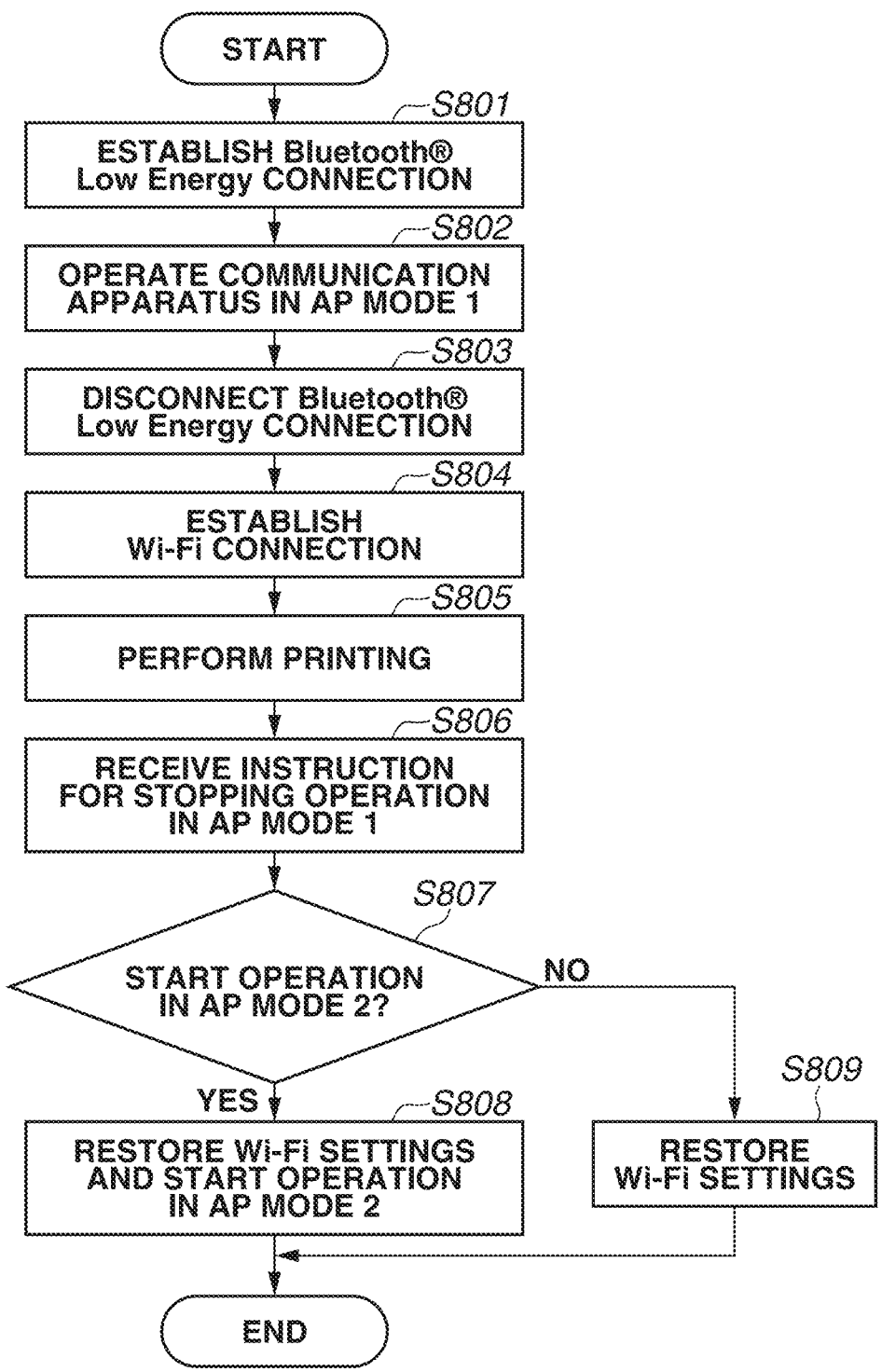
FIG. 8 is a flowchart illustrating a procedure of transmission processing performed by the communication apparatus.

FIG. 8 is a flowchart illustrating a procedure of print processing performed by the communication apparatus 151 according to the present exemplary embodiment. For example, the flowchart illustrated in FIG. 8 is implemented by the CPU 154 reading a program stored in the ROM 152 or the external storage device (not illustrated) included in the communication apparatus 151 into the RAM 153 and executing the program. The processing illustrated in the present flowchart is started in a state where the Bluetooth® Low Energy function of the communication apparatus 151 is enabled. The processing illustrated in the present flowchart is print processing in a case where the communication apparatus 151 and the information processing apparatus 101 do not belong to the same Wi-Fi network and the communication apparatus 151 is not operating in AP mode 2.

In step S801, the CPU 154 establishes a Bluetooth® Low Energy connection between the information processing apparatus 101 and the communication apparatus 151 by receiving a response to the advertising information transmitted by the communication apparatus 151 from the information processing apparatus 101.

In step S802, the CPU 154 operates the communication apparatus 151 in AP mode 1 based on the instruction transmitted from the information processing apparatus 101 in step S714.

In step S803, the CPU 154 disconnects the Bluetooth® Low Energy connection between the information processing apparatus 101 and the communication apparatus 151. The CPU 154 may omit the processing of step S803 to maintain the Bluetooth® Low Energy connection.

In step S804, the CPU 154 establishes a Wi-Fi connection between the communication apparatus 151 and the information processing apparatus 101 based on reception of the first connection information from the information processing apparatus 101.

In step S805, the CPU 154 performs printing based on the print job transmitted from the information processing apparatus 101 in step S717.

In step S806, the CPU 154 stops operating in AP mode 1 by receiving an instruction for stopping operation in AP mode 1 from the information processing apparatus 101 via the Wi-Fi connection. The Wi-Fi connection between the communication apparatus 151 and the information processing apparatus 101 is thereby disconnected. The processing of step S806 and the subsequent steps may be performed after the communication apparatus 151 receives the print job from the information processing apparatus 101, e.g., before the completion of the printing based on the print job.

In step S807, the CPU 154 determines whether to start operation in AP mode 2. Details of this processing are similar to those of step S612. In a case where the CPU 154 determines that operation is started in AP mode 2 (YES in step S807), the processing proceeds to step S808. In a case where the CPU 154 determines that operation is not started in AP mode 2 (NO in step S807), the processing proceeds to step S809.

In step S808, which is performed in a case where the CPU 154 determines that operation is started in AP mode 2 (YES in step S807), the CPU 154 restores the Wi-Fi settings of the communication apparatus 151 to those before the operation in AP mode 1, and causes the communication apparatus 151 to start operation in AP mode 2 using the 2.4-GHz frequency band.

In step S809, which is performed in a case where the CPU 154 determines that operation is not started in AP mode 2 (NO in step S807), the CPU 154 restores the Wi-Fi settings of the communication apparatus 151 to those before the operation in AP mode 1. In other words, the CPU 154 reestablishes the infrastructure connection using the 5-GHz frequency band. Here, the CPU 154 does not allow the communication apparatus 151 to start operation in AP mode 2. The processing of the present flowchart ends.

With the foregoing configuration, the communication apparatus 151 can receive the job from the information processing apparatus 101 by performing Bluetooth® Low Energy communication and then performing Wi-Fi communication, even in an environment where a job is unable to be received from the information processing apparatus 101 by using only Wi-Fi communication. After the reception of the job from the information processing apparatus 101, the communication apparatus 151 automatically operates itself in AP mode 1. The communication apparatus 151 can thereby construct an environment where a job can be received from the information processing apparatus 101 by using only Wi-Fi communication. In other words, on the next job transmission, the information processing apparatus 101 can transmit a job to the communication apparatus 151 by using only Wi-Fi communication without using Bluetooth® Low Energy communication.

For example, simultaneous controls may be controlled to not be performed in a state where an infrastructure connection is established using a DFS-applied frequency band in the 5-GHz frequency band. Specifically, for example, the CPU 154 may determine in step S807 whether an infrastructure connection (connection with an AP) using a DFS-applied frequency band in the 5-GHz frequency band is established before starting operation in AP mode 2.

In addition, for example, if the state of the communication apparatus 151 before operation in AP mode 2 is where an infrastructure connection using the 5-GHz frequency band is established, the communication apparatus 151 may be operated in a state capable of direct connection. Specifically, for example, to give higher priority to the operation of the communication apparatus 151 in the state capable of direct connection, the communication apparatus 151 may be left unrestored to the state of the communication apparatus 151 before the operation in AP mode 2.

Other Embodiments

An exemplary embodiment of the present invention may be implemented by processing for supplying a program for implementing one or more functions of the foregoing exemplary embodiment to a system or an apparatus via a network or a storage medium, and reading and executing the program by one or more processors of a computer in the system or apparatus. A circuit for implementing one or more functions (for example, application specific integrated circuit (ASIC)) may be used for implementation.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-016167, filed Jan. 31, 2019, which is hereby incorporated by reference herein in its entirety.

What is claimed is:

1. A control method of an information processing apparatus capable of communicating using a first communication method and communicating using a second communication method, the control method comprising:

performing predetermined communication by the second communication method before a communication instruction for predetermined data is accepted from a user, the predetermined communication being used to establish a connection with a communication apparatus using the first communication method;

obtaining information about a capability of the communication apparatus via the connection with the communication apparatus using the first communication method before the communication instruction is accepted, the connection being established by the predetermined communication;

accepting the communication instruction from the user;

after the communication instruction is accepted, performing attempting processing for attempting to establish a connection with the communication apparatus using the first communication method;

in a case where the attempting processing successfully establishes the connection with the communication apparatus using the first communication method, communicating the predetermined data with the communication apparatus via the connection with the communication apparatus using the first communication method without communication with the communication apparatus by the second communication method, the communication being used to establish the connection with the communication apparatus using the first communication method; and in a case where the attempting processing fails to establish the connection with the communication apparatus using the first communication method, performing the communication with the communication apparatus by the second communication method and communicating the predetermined data with the communication apparatus via the connection with the communication apparatus using the first communication method, the communication being used to establish the connection with the communication apparatus using the first communication method.

2. The control method according to claim 1, further comprising obtaining predetermined connection information for establishing the connection with the communication apparatus using the first communication method, wherein the attempting processing is performed by using the predetermined connection information.

3. The control method according to claim 2, wherein the predetermined connection information is obtained from the communication apparatus by the second communication method before the communication instruction is accepted.

4. The control method according to claim 1, further comprising obtaining predetermined connection information for establishing the connection with the communication apparatus using the first communication method, wherein the attempting processing is performed using the predetermined connection information, wherein other connection information different from the predetermined connection information is obtained from the communication apparatus by the predetermined communication, the other connection information being used to establish the connection with the communication apparatus using the first communication method, and wherein the information about the capability of the communication apparatus is obtained via the connection with the communication apparatus using the first communication method, the connection being established by using the other connection information.

5. The control method according to claim 4, wherein in a case where the attempting processing fails to establish the connection with the communication apparatus using the first communication method, the communication used to establish the connection with the communication apparatus using the first communication method is performed with the communication apparatus by the second communication method, and then the connection with the communication apparatus using the first communication method is established by using the other connection information.

6. The control method according to claim 1, further comprising after the information about the capability of the communication apparatus is obtained via the connection with the communication apparatus using the first communication method, performing processing for restoring a state of connection of the information processing apparatus using the first communication method to a state before the connection with the communication apparatus using the first communication method is established.

7. The control method according to claim 1, wherein in a case where the information about the capability of the communication apparatus is obtained via the connection with the communication apparatus using the first communication method, the connection being established without the predetermined communication, the attempting processing is not performed despite acceptance of the communication instruction, and wherein in a case where the information about the capability of the communication apparatus is obtained via the connection with the communication apparatus using the first communication method, the connection being established by the predetermined communication, the attempting processing is performed after the communication instruction is accepted.

8. The control method according to claim 1, wherein in a case where the attempting processing fails to establish the connection with the communication apparatus using the first communication method, connection information for establishing the connection with the communication apparatus using the first communication method is received as the communication used to establish the connection with the communication apparatus using the first communication method.

9. The control method according to claim 1, wherein in a case where the attempting processing fails to establish the connection with the communication apparatus using the first communication method, a shift instruction for shifting the communication apparatus into a state capable of establishing a connection using the first communication method is transmitted as the communication used to establish the connection with the communication apparatus using the first communication method.

10. The control method according to claim 1, further comprising after the communication instruction is accepted, performing search processing for searching a network to which the information processing apparatus belongs for the communication apparatus, wherein in a case where the communication apparatus is found by the search processing, the predetermined data is communicated with the communication apparatus via the network without communicating with the communication apparatus using the second communication method.

11. The control method according to claim 10, wherein in a case where the communication apparatus is found by the search processing, the predetermined data is communicated with the communication apparatus via the network without the attempting processing or communicating with the communication apparatus using the second communication method, and wherein in a case where the communication apparatus is not found by the search processing, the attempting processing is performed.

12. The control method according to claim 10, further comprising obtaining identification information about the communication apparatus before the communication instruction is accepted, wherein the search processing is performed based on the identification information.

13. The control method according to claim 12, wherein the identification information is any one of a serial number of the communication apparatus, a media access control (MAC) address of the communication apparatus, and a Bonjour name of the communication apparatus.

14. The control method according to claim 1, further comprising performing authentication processing between the communication apparatus and the information processing apparatus by using the second communication method before the communication instruction is accepted, wherein the communication apparatus and the information processing apparatus generate the same authentication information by the authentication processing, and wherein after the authentication processing is performed, communication using the second communication method between the communication apparatus and the information processing apparatus is performed based on the authentication information.

15. The control method according to claim 1, further comprising after the predetermined data is communicated with the communication apparatus via the connection with the communication apparatus using the first communication method, performing processing for restoring a state of connection of the information processing apparatus using the first communication method to a state before the connection with the communication apparatus using the first communication method is established.

16. The control method according to claim 1, wherein the first communication method is Wireless Fidelity (Wi-Fi).

17. The control method according to claim 1, wherein the second communication method is Bluetooth®.

18. The control method according to claim 17, wherein the second communication method is Bluetooth® Low Energy.

19. The control method according to claim 1, wherein the predetermined data is a print job for causing the communication apparatus to perform printing or a scan job for causing the communication apparatus to perform scanning.

20. The control method according to claim 1, wherein the connection established by the attempting processing is a connection with the communication apparatus using the first communication method without using an external apparatus, the external apparatus being an apparatus outside the communication apparatus and outside the information processing apparatus.

21. The control method according to claim 1, further comprising obtaining predetermined connection information for establishing the connection with the communication apparatus using the first communication method, wherein the attempting processing is performed using the predetermined connection information, and wherein the predetermined connection information is obtained from the communication apparatus by the predetermined communication.

22. The control method according to claim 1, further comprising obtaining predetermined connection information for establishing the connection with the communication apparatus using the first communication method, wherein the attempting processing is performed using the predetermined connection information, and wherein the predetermined connection information is obtained from the communication apparatus via the connection with the communication apparatus using the first communication method, the connection being established by the predetermined communication.

23. An information processing apparatus capable of communicating using a first communication method and communicating using a second communication method, the information processing apparatus comprising:

at least one memory storing instructions;

at least one processor, that, when executing the instructions, causes the information processing apparatus to;

perform predetermined communication by the second communication method before a communication instruction for predetermined data is accepted from a user, the predetermined communication being used to establish a connection with a communication apparatus using the first communication method;

obtain information about a capability of the communication apparatus via the connection with the communication apparatus using the first communication method before the communication instruction is accepted, the connection being established by the predetermined communication;

accept the communication instruction from the user;

execute an attempt, after the communication instruction is accepted, perform attempting processing for attempting to establish a connection with the communication apparatus using the first communication method; and perform communication, in a case where the attempting processing successfully establishes the connection with the communication apparatus using the first communication method, communicate the predetermined data with the communication apparatus via the connection with the communication apparatus using the first communication method without communication with the communication apparatus by the second communication method, the communication being used to establish the connection with the communication apparatus using the first communication method, and in a case where the attempting processing fails to establish the connection with the communication apparatus using the first communication method, perform the communication with the communication apparatus by the second communication method and communicate the predetermined data with the communication apparatus via the connection with the communication apparatus using the first communication method, the communication being used to establish the connection with the communication apparatus using the first communication method.

* * * * *